United States Patent Office 3,549,654
Patented Dec. 22, 1970

3,549,654
1,1'-ALKYLENE-BIS(3,3-DICHLORO-2-PYRROLIDINONES)
Joseph C. Collins, East Greenbush, N.Y., assignor to Sterling Drug Inc., New York, N.Y., a corporation of Delaware
No Drawing. Filed Oct. 9, 1967, Ser. No. 673,926
Int. Cl. C07d 27/08
U.S. Cl. 260—326.3    2 Claims

ABSTRACT OF THE DISCLOSURE

The invention relates to 3,3-dichloro-2-pyrrolidinones and bis(3,3-dichloro-2-pyrrolidinones) having useful anti-inflammatory properties as determined by their inhibition of carrageenan induced edema in rats, and to intermediates for their preparation.

---

The invention relates to 3,3-dichloro-2-pyrrolidinone derivatives and to intermediates and processes for their preparation.

An aspect of my invention are the compounds having the Formula I

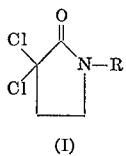

(I)

where R is one of the group consisting of phenyl-lower-alkyl, 3-indolyl-lower-alkyl, phenyl, naphthyl, 5,6,7,8-tetrahydro-naphthyl, fluoroenyl, 9-oxofluorenyl, pyridyl, pyrimidyl and benzothiazolyl radicals, and such radicals substituted by from one to three substituents of the group consisting of halo, lower-alkyl, phenyl-lower-alkyl, lower-alkoxy, phenyl-lower-alkoxy, phenoxy, lower-alkylmercapto, lower-alkylsulfonyl, trihalomethyl, nitro, di(lower-alkyl)amino, lower-alkanoylamino, amino, lower-alkanoyloxy and hydroxy.

In the compounds of my invention having the Formula I above, when the radicals represented by R are substituted, as described hereinabove, by more than one substituent, such substituents can be the same or different and they can be in any of the various position combinations relative to each other.

Another aspect of my invention are the compounds having the Formula II

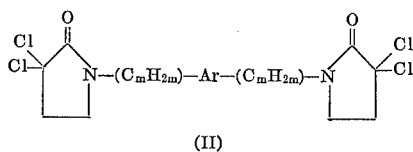

(II)

where m is a number from 0 to 3 inclusive and Ar is phenylene, biphenylylene, or phenylene or biphenylylene substituted by from one to three substituents of the group consisting of halo, lower alkyl, phenyl-lower-alkyl, lower-alkoxy, phenyl-lower-alkoxy, phenoxy, lower-alkylmercapto, lower-alkylsulfonyl, trihalomethyl, nitro, di(lower-alkyl)amino, lower-alkanoylamino, amino, lower-alkanoyloxy and hydroxy.

In the compounds of my invention having the Formula II above, when phenylene or biphenylylene, represented by Ar, are substituted, as described hereinabove, by more than one substituent, such substituents can be the same or different and they can be in any of the various position combinations relative to each other.

Another aspect of my invention are the compounds having the Formula III

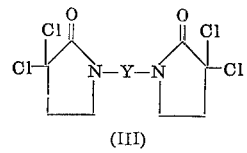

(III)

where Y is alkylene having from two to twelve carbon atoms.

Another aspect of my invention are the compounds having the Formula IV

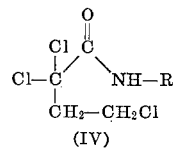

(IV)

where R has the same meaning defined hereinbefore.

The compounds of Formula IV above are useful as intermediates in the preparation of my compounds having the Formula I above.

Another aspect of my invention are the compounds having the Formula V

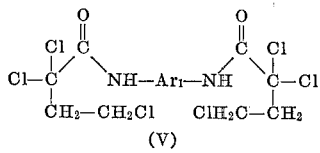

(V)

where $Ar_1$ is biphenylylene or biphenylylene substituted as described hereinbefore for biphenylylene as represented by Ar in Formula II above.

The compounds of Formula V above are useful as intermediates in the preparation of my compounds within the scope of Formula II.

In Formula I above where R is phenyl-lower-alkyl or phenyl-lower-alkyl substituted as hereinbefore defined for the radicals represented by R, the term "phenyl-lower-alkyl" means a group wherein lower-alkyl contains from one to six carbon atoms which can be arranged as straight or branched chains, which without limiting the generality of the foregoing is illustrated by phenylmethyl, 2-phenyl-1-ethyl, 3-phenyl-1-propyl, 2-phenyl-1-propyl, 4-phenyl-1-butyl, 4-phenyl-2-butyl, 5-phenyl-1-amyl, 6-phenyl-1-hexyl, and the like.

In Formula I above where R is 3-indolyl-lower-alkyl or 3-indolyl-lower-alkyl substituted as hereinbefore defined for the radicals represented by R, the term "3-indolyl-lower-alkyl" means a group wherein lower-alkyl contains from one to three carbon atoms which can be arranged as straight or branched chains, which without limiting the generality of the foregoing is illustrated by (3-indolyl)methyl, 2-(3-indolyl)-1-ethyl, 3-(3-indolyl)-1-propyl, 2-(3-indolyl)-1-propyl, and the like.

The divalent aromatic radicals as represented by Ar in Formula II and $Ar_1$ in Formula V can have each of their two connecting linkages bound to any available carbon atom of the aromatic rings such that they can be in any of the various position combinations relative to each other.

In the above Formula II, when m is 0, the nitrogen atoms are each linked directly to a ring carbon atom of the radicals represented by Ar.

In the above Formula II, where m is an integer from 1 to 3 inclusive, $C_mH_{2m}$ represesnts lower-alkylene as illustrated by —CH$_2$—, —CH$_2$CH$_2$—, —CH$_2$CH$_2$CH$_2$—, —CH(CH$_3$)CH$_2$—,

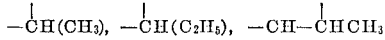

and the like.

In Formula III above, Y represents alkylene having its connecting linkages on different carbon atoms as illustrated by —CH$_2$CH$_2$—, —CH$_2$CH$_2$CH$_2$—, —(CH$_2$)$_4$—, —(CH$_2$)$_5$—, —(CH$_2$)$_6$—, —(CH$_2$)$_8$—, —(CH$_2$)$_{10}$—, —(CH$_2$)$_{12}$—, —CH(CH$_3$)CH$_2$—, —C(CH$_3$)$_2$CH$_2$—,

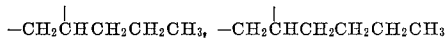

—CH$_2$CH(CH$_3$)CH(CH$_3$)CH$_2$CH$_2$CH$_2$—, and the like.

The term "halo," as used hereinabove and throughout this specification, includes chloro, bromo, iodo and fluoro.

The terms "lower-alkyl," "lower-alkanoyloxy," "lower-alkanoyl," and "lower-alkoxy," as used hereinabove and throughout this specification, means such groups preferably containing from one to six carbon atoms which can be arranged as straight or branched chains, and without limiting the generality of the foregoing, are illustrated by methyl, ethyl, propyl, isopropyl, butyl, sec.-butyl, amyl, hexyl, acetoxy, propionoxy, trimethylacetoxy, acetyl propionyl, trimethylacetyl, methoxy, ethoxy, isobutoxy, and the like.

The novel compounds of my invention, represented by Formulas I, II, and III above, are prepared by ring closure of the corresponding 2,2,4-trichlorobutyramides, having the Formula IV, and bis(2,2,4-trichlorobutyramides) having the Formulas VI and VIII

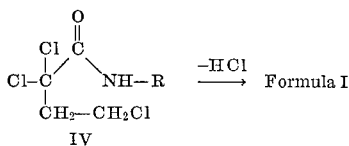

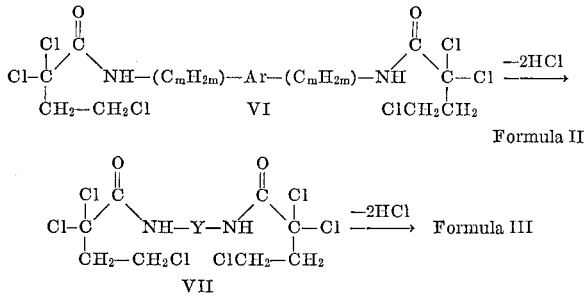

wherein R of Formula IV, Ar and *m* of Formula VI, and Y of Formula VII have the meaning hereinbefore defined for Formulas I, II and III respectively.

The reaction is advantageously performed in a suitable solvent in the presence of at least a stoichiometric amount of an acid-acceptor and in a temperature range of from about 5° C. to 80° C.

The reaction is preferably carried out at room temperature in methyl or ethyl alcohol in the presence of a stoichiometric amount or slight excess of sodium hydroxide.

The intermediate 2,2,4-trichlorobutyramides having the Formula IV, and the bis(2,2,4-trichlorobutyramides) having the Formulas VI and VII, are prepared by reacting the corresponding mono-amine having the formula R—NH$_2$ (VIII) and di-amines having the formulas H$_2$N—(C$_m$H$_{2m}$)—Ar—(C$_m$H$_{2m}$)—NH$_2$ (IX)

and H$_2$N—Y—NH$_2$ (X), where R, *m* and Ar, and Y have the meaning hereinbefore defined for Formulas I, II, and III respectively, which belong to known classes of compounds, with the appropriate amount of the known acid chloride, 2,2,4-trichlorobutyryl chloride, in a suitable solvent in the presence of a stoichiometric amount of an acid-acceptor such as sodium hydroxide, sodium carbonate, or triethylamine and at a temperature ranging from about 0° to 25° C.

The reaction is preferably carried out by dissolving the appropriate mono-amine having the Formula VIII above, or di-amines having the Formulas IX and X above, in benzene or ethylene dichloride, adding an aqueous solution of a stoichiometric amount of sodium carbonate or sodium hydroxide, cooling to 5° to 10° C., and gradually adding a stoichiometric amount of 2,2,4-trichlorobutyryl chloride.

The compounds of my invention, having the Formulas I, II, and III above, are therapeutically active substances which possess useful anti-inflammatory properties. The actual determination of the numerical biological data definitive for a particular compound is readily determined by standard test procedures by technicians having ordinary skill in pharmacological test procedures, without the need for any extensive experimentation.

The anti-inflammatory activity of the compounds of my invention having the Formulas I, II, and III above, was determined in the carrageenan edema test [Winter et al., Proc. Soc. Exp. Biol. Med. 111, 544–547 (1962)] wherein the test agents were administered orally in multiple doses to fasted male albino rats. One hour after medication five hundredths of one ml. of 0.75% carrageenan was injected into the foot of each rat and three hours after the injections of carrageenan the weight of the foot edema was determined. The calculated difference between the average weight of the control and medicated rats was used as a measure of the degree of inhibition of carrageenan edema due to the administration of the test agent. Consistent, significant inhibition of carrageenan edema was found when the compounds of this invention were administered orally at doses ranging from 25 to 400 mg./kg.

The compounds having the Formulas I, II, and III above, can be prepared for use by conventional pharmaceutical procedures; that is, in an aqueous or oil suspension in a pharmaceutically acceptable vehicle (aqueous alcohol, glycol, oil solution, or oil-water emulsion) for parenteral or oral administration; in capsule or tablet form with conventional excipients (for example, calcium carbonate, starch, lactose, talc, magnesium stearate, gum acacia, and the like) for oral administration.

The molecular structures of the compounds of this invention were assigned on the basis of the method of their synthesis and study of their infrared spectra, and confirmed by the correspondence between calculated and found values for the elementary analysis for representative examples.

My invention is illustrated by the following examples without, however, being limited thereto.

EXAMPLE 1

(A) N-(4-chlorophenyl)-2,2,4-trichlorobutyramide

To a stirred, ice-cooled mixture of 4.2 g. sodium hydroxide in 100 ml. water and 12.7 g. 4-chloroaniline in 200 ml. ethylene dichloride was added 21 g. 2,2,4-trichlorobutyryl chloride during fifteen minutes. The mixture was stirred for one-half hour and the precipitate was filtered and washed with water. The filtrate was washed with dilute aqueous hydrochloric acid solution and water, dried over sodium sulfate, and evaporated to dryness to yield N-(4-chlorophenyl)-2,2,4-trichlorobutyramide as a solid which was combined with the crop obtained by filtration and used as such in the next step.

(B) 3,3-dichloro-1-(4-chlorophenyl)-2-pyrrolidinone

To a stirred solution of the N-(4-chlorophenyl)-2,2,4-trichlorobutyramide, from Example 1A, in 200 ml. ethyl alcohol was added a solution of 4.2 g. sodium hydroxide in 42 ml. water. Stirring was continued for ten minutes and dilute aqueous hydrochloric acid solution was added until the solution turned acidic, followed by 300 ml. water.

The resulting crystals were filtered to give after recrystallization from carbon tetrachloride 18.4 g. 3,3-dichloro-1-(4-chlorophenyl)-2-pyrrolidinone; M.P. 108.4–109.2° C. (corr.).

EXAMPLE 2

(A) N-(2-chlorophenyl)-2,2,4-trichlorobutyramide

To a stirred, ice-cooled mixture of 9.5 g. 2-chloroaniline in 100 ml. ethylene dichloride and 3.15 g. sodium hydroxide in 75 ml. water was added 15.8 g. 2,2,4-trichlorobutyryl chloride in 50 ml. ethylene dichloride during one-half hour and stirring was continued one-half hour. The ethylene dichloride phase was separated, washed with dilute aqueous hydrochloric acid and water and evaporated to dryness to yield N-(2-chlorophenyl)-2,2,4-trichlorobutyramide as a yellow oil which was used as such in the next step.

(B) 3,3-dichloro-1-(2-chlorophenyl)-2-pyrrolidinone

To a stirred solution of the N-(2-chlorophenyl)-2,2,4-trichlorobutyramide from Example 2A in 150 ml. ethyl alcohol was added a solution of 3.15 g. sodium hydroxide in 32 ml. water in small portions during one-half hour and stirring was continued for one-half hour. On standing a precipitate formed which was collected by filtration and recrystallized from benzene-hexane to yield 6.9 g. 3,3-dichloro - 1 - (2 - chlorophenyl)-2-pyrrolidinone; M.P. 91–92° C.

Following a procedure similar to that described in Example 2A and substituting for 2-chloroaniline an equivalent amount of:

(a) 4-(n-butyl)aniline
(b) 2-bromo-4,6-dinitroaniline
(c) 3,4-diethoxyaniline
(d) 4-butylmercaptoaniline
(e) 2,4,5-trichloroaniline
(f) 2-bromo-6-chloro-4-nitroaniline
(g) 4-(5-phenylpentyloxy)aniline
(h) 4-phenethyloxyaniline
(i) 2-bromo-4-isopentylaniline
(j) 2,5-dimethyl-4-nitroaniline
(k) 2-butoxyaniline
(l) 2,6-dichloro-4-ethylmercaptoaniline
(m) 4-(tert-butyl)sulfonylaniline
(n) 4-[3-(4-nitrophenyl)propyl]aniline
(o) 4-dimethylaminoaniline
(p) 4-dibutylaminoaniline there can be obtained respectively, according to this invention:

(a) N-[4-(n-butyl)phenyl]-2,2,4-trichlorobutyramide
(b) N-(2-bromo-4,6-dinitrophenyl)-2,2,4-trichlorobutyramide
(c) N-(3,4-diethoxyphenyl)-2,2,4-trichlorobutyramide
(d) N-(4-butylmercaptophenyl)-2,2,4-trichlorobutyramide
(e) N-(2,4,5-trichlorophenyl)-2,2,4-trichlorobutyramide
(f) N-(2-bromo-6-chloro-4-nitrophenyl)-2,2,4-trichlorobutyramide
(g) N-[4-(5-phenylpentyloxy)phenyl]-2,2,4-trichlorobutyramide
(h) N-(4-phenethyloxyphenyl)-2,2,4-trichlorobutyramide
(i) N-(2-bromo-4-isopentylphenyl)-2,2,4-trichlorobutyramide
(j) N-(2,5-dimethyl-4-nitrophenyl)-2,2,4-trichlorobutyramide
(k) N-(2-butoxyphenyl)-2,2,4-trichlorobutyramide
(l) N-(2,6-dichloro-4-ethylmercaptophenyl)-2,2,4-trichlorobutyramide
(m) N-[4-(tert-butyl)sulfonylphenyl]-2,2,4-trichlorobutyramide
(n) N-{4-[3-(4-nitrophenyl)propyl]phenyl}-2,2,4-trichlorobutyramide
(o) N-(4-dimethylaminophenyl)-2,2,4-trichlorobutyramide
(p) N-(4-dibutylaminophenyl)-2,2,4-trichlorobutyramide Following a procedure similar to that described in Example 2B and substituting for N-(2-chlorophenyl)-2,2,4-trichlorobutyramide an equivalent amount of:

(a) N-[4-(n-butyl)phenyl]-2,2,4-trichlorobutyramide
(b) N-(2-bromo-4,6-dinitrophenyl)-2,2,4-trichlorobutyramide
(c) N-(3,4-diethoxyphenyl)-2,2,4-trichlorobutyramide
(d) N-(4-butylmercaptophenyl)-2,2,4-trichlorobutyramide
(e) N-(2,4,5-trichlorophenyl)-2,2,4-trichlorobutyramide
(f) N-(2-bromo-6-chloro-4-nitrophenyl)-2,2,4-trichlorobutyramide
(g) N-[4-(5-phenylpentyloxy)phenyl]-2,2,4-trichlorobutyramide
(h) N-(4-phenethyloxyphenyl)-2,2,4-trichlorobutyramide
(i) N-(2-bromo-4-isopentylphenyl)-2,2,4-trichlorobutyramide
(j) N-(2,5-dimethyl-4-nitrophenyl)-2,2,4-trichlorobutyramide
(k) N-(2-butoxyphenyl)-2,2,4-trichlorobutyramide
(l) N-(2,6-dichloro-4-ethylmercaptophenyl)-2,2,4-trichlorobutyramide
(m) N-[4-(tert-butyl)sulfonylphenyl]-2,2,4-trichlorobutyramide
(n) N-{4-[3-(4-nitrophenyl)propyl]phenyl}-2,2,4-trichlorobutyramide
(o) N-(4-dimethylaminophenyl)-2,2,4-trichlorobutyramide
(p) N-(4-dibutylaminophenyl)-2,2,4-trichlorobutyramide there can be obtained respectively, according to this invention:

(a) 3,3-dichloro-1-[4-(n-butyl)phenyl]-2-pyrrolidinone
(b) 3,3-dichloro-1-(2-bromo-4,6-dinitrophenyl)-2-pyrrolidinone
(c) 3,3-dichloro-1-(3,4-diethoxyphenyl)-2-pyrrolidinone
(d) 3,3-dichloro-1-(4-butylmercaptophenyl)-2-pyrrolidinone
(e) 3,3-dichloro-1-(2,4,5-trichlorophenyl)-2-pyrrolidinone
(f) 3,3-dichloro-1-(2-bromo-6-chloro-4-nitrophenyl)-2-pyrrolidinone
(g) 3,3-dichloro-1-[4-(5-phenylpentyloxy)phenyl]-2-pyrrolidinone
(h) 3,3-dichloro-1-(4-phenethyloxyphenyl)-2-pyrrolidinone
(i) 3,3-dichloro-1-(2-bromo-4-isopentylphenyl)-2-pyrrolidinone
(j) 3,3-dichloro-1-(2,5-dimethyl-4-nitrophenyl)-2-pyrrolidinone
(k) 3,3-dichloro-1-(2-butoxyphenyl)-2-pyrrolidinone
(l) 3,3-dichloro-1-(2,6-dichloro-4-ethylmercaptophenyl)-2-pyrrolidinone
(m) 3,3-dichloro-1-[4-(tert-butyl)sulfonylphenyl]-2-pyrrolidinone
(n) 3,3-dichloro-1-{4-[3-(4-nitrophenyl)propyl]phenyl}-2-pyrrolidinone
(o) 3,3-dichloro-1-(4-dimethylaminophenyl)-2-pyrrolidinone
(p) 3,3-dichloro-1-(4-dibutylaminophenyl)-2-pyrrolidinone Following a procedure similar to that described in Example 2A and substituting for 2-chloroaniline and sodium hydroxide an equivalent amount of 4-acetoxyaniline and triethylamine respectively and omitting the 75 ml. water, there can be obtained according to this invention N-(4-acetoxyphenyl)2,2,4-trichlorobutyramide.

Following a procedure similar to that described in Example 2B and substituting for N-(2-chlorophenyl)-2,2,4-trichlorobutyramide an equivalent amount of N - (4-acetoxyphenyl)2,2,4 - trichlorobutyramide and increasing the amount of ethyl alcohol from 150 ml. to 300 ml., there can be obtained 3,3-dichloro-1-(4-acetoxyphenyl)-2-pyrrolidinone.

By treating 3,3 - dichloro-1-(4-acetoxyphenyl)-2-pyrrolidinone in aqueous methyl alcohol, at room temperature, with an amount of potassium hydroxide which is in slight excess of that required to hydrolyze the acetoxy group, there can be obtained 3,3-dichloro-1-(4-hydroxyphenyl)-2-pyrrolidinone.

EXAMPLE 3

(A) N-(3-chlorophenyl)-2,2,4-trichlorobutyramide)

Following a procedure similar to that described in Example 2A and using 6.37 g. 3-chloroaniline, 2.1 g. sodium hydroxide and 10.5 g. 2,2,4-trichlorobutyryl chloride, there was obtained N - (3-chlorophenyl)-2,2,4-trichlorobutyramide as an orange oil which was used as such in the next step.

(B) 3,3-dichloro-1-(3-chlorophenyl)-2-pyrrolidinone

Following a procedure similar to that described in Example 2B and using the N - (3 - chlorophenyl)-2,2,4-trichlorobutyramide from Example 3A and 2.1 g. sodium hydroxide, there was obtained after recrystallization from methyl alcohol-water 6.7 g. 3,3 - dichloro-1-(3 - chlorophenyl)-2-pyrrolidinone; M.P. 76–77.5° C.

EXAMPLE 4

(A) N-(3-fluorophenyl)-2,2,4-trichlorobutyramide

Following a procedure similar to that described in Example 2A and using 5.55 g. 3-fluoroaniline, 2.1 g. sodium hydroxide, and 10.5 g. 2,2,4 - trichlorobutyryl chloride, there was obtained N - (3-fluorophenyl)-2,2,4-trichlorobutyramide as an orange oil which was used as such in the next step.

(B) 3,3-dichloro-1-(3-fluorophenyl)-2-pyrrolidinone

Following a procedure similar to that described in Example 2B and using the N-(3-fluorophenyl) - 2,2,4 - trichlorobutyramide from Example 4A and 2.1 g. sodium hydroxide, there was obtained after recrystallization from benzene-hexane 7.3 g. 3,3-dichloro-1-(3-fluorophenyl)-2-pyrrolidinone; M.P. 88–90° C.

EXAMPLE 5

(A) N-(4-fluorophenyl)-2,2,4-trichlorobutyramide

Following a procedure similar to that described in Example 2A and using 5.55 g. 4-fluoroaniline, 2.1 g. sodium hydroxide, and 10.5 g. 2,2,4-trichlorobutyryl chloride there was obtained N - (4-fluorophenyl)-2,2,4-trichlorobutyramide as brown crystals which was used as such in the next step.

(B) 3,3-dichloro-1-(4-fluorophenyl)-2-pyrrolidinone

Following a procedure similar to that described in Example 2B and using the N-(4-fluorophenyl) - 2,2,4 - trichlorobutyramide from Example 5A and 2.1 g. sodium hydroxide, there was obtained after recrystallization from methyl alcohol-water 5.8 g. 3,3-dichloro - 1 - (4-fluorophenyl)-2-pyrrolidinone; M.P. 106–107° C.

EXAMPLE 6

(A) N-(4-bromophenyl)-2,2,4-trichlorobutyramide

Following a procedure similar to that described in Example 2A and using 8.6 g. 4-bromoaniline, 2.1 g. sodium hydroxide, and 10.5 g. 2,2,4-trichlorobutyryl chloride, there was obtained N - (4-bromophenyl)-2,2,4-trichlorobutyramide as a yellow oil which was used as such in the next step.

(B) 3,3-dichloro-1-(4-bromophenyl)-2-pyrrolidinone

Following a procedure similar to that described in Example 2B and using the N - (4-bromophenyl)-2,2,4-trichlorobutyramide from Example 6A and 2.1 g. sodium hydroxide, there was obtained after recrystallization from benzene-hexane 9.8 g. 3,3-dichloro-1-(4-bromophenyl)-2-pyrrolidinone; M.P. 122–124° C.

EXAMPLE 7

(A) N-phenyl-2,2,4-trichlorobutyramide

Following a procedure similar to that described in Example 2A and using 4.65 g. aniline, 2.1 g. sodium hydroxide, and 10.5 g. 2,2,4-trichlorobutyryl chloride, there was obtained N-phenyl-2,2,4-trichlorobutyramide as a yellow solid which was used as such in the next step.

(B) 3,3-dichloro-1-phenyl-2-pyrrolidinone

Following a procedure similar to that described in Example 2B and using the N-phenyl-2,2,4-trichlorobutyramide from Example 7A and 2.1 g. sodium hydroxide, there was obtained after recrystallization from methyl alcohol-water 6.3 g. of 3,3-dichloro-1-phenyl - 2 - pyrrolidinone; M.P. 85–87° C.

EXAMPLE 8

(A) N-(4-tolyl)-2,2,4-trichlorobutyramide

Following a procedure similar to that described in Example 2A and using 5.35 g. p-toluidine, 2.1 g. sodium hydroxide, and 10.5 g. 2,2,4-trichlorobutyryl chloride, there was obtained N-(4-tolyl)-2,2,4-trichlorobutyramide as an oil which was used as such in the next step.

(B) 3,3-dichloro-1-(4-tolyl)-2-pyrrolidinone

Following a procedure similar to that described in Example 2B and using the N-(4-tolyl)-2,2,4-trichlorobutyramide from Example 8A and 2.1 g. sodium hydroxide, there was obtained after recrystallization from benzene-hexane 7.6 g. 3,3 - dichloro-1-(4-tolyl)-2-pyrrolidinone; M.P. 118–19.5° C.

EXAMPLE 9

(A) N-(4-methoxyphenyl)-2,2,4-trichlorobutyramide

Following a procedure similar to that described in Example 2A and using 6.15 g. p-anisidine, 2.1 g. sodium hydroxide, and 10.5 g. 2,2,4-trichlorobutyryl chloride, there was obtained N-(4-methoxyphenyl)-2,2,4-trichlorobutyramide as brown crystals which were used as such in the next step.

(B) 3,3-dichloro-1-(4-methoxyphenyl)-2-pyrrolidinone

Following a procedure similar to that described in Example 2B and using the N-(4-methoxyphenyl)-2,2,4-trichlorobutyramide from Example 9A and 2.1 g. sodium hydroxide, there was obtained after recrystallization from ethyl acetate 5.9 g. 3,3-dichloro-1-(4-methoxyphenyl)-2-pyrrolidinone; M.P. 121–121.5° C.

EXAMPLE 10

(A) N-(3,4-dimethoxyphenyl)-2,2,4-trichlorobutyramide

Following a procedure similar to that described in Example 2A and using 7.2 g. 3,4-dimethoxyaniline, 2.0 g. sodium hydroxide, and 9.9 g. 2,2,4-trichlorobutyryl chloride, there was obtained N-(3,4-dimethoxyphenyl)-2,2,4-trichlorobutyramide which was used without further purification in the next step.

(B) 3,3-dichloro-1-(3,4-dimethoxyphenyl)-2-pyrrolidinone

Following a procedure similar to that described in Example 2B and using the N-(3,4-dimethoxyphenyl)-2,2,4-trichlorobutyramide from Example 10A and 2.0 g. sodium hydroxide, there was obtained after recrystallization from acetone 6.9 g. 3,3-dichloro-1-(3,4-dimethoxyphenyl)-2-pyrrolidinone; M.P. 183–185° C.

EXAMPLE 11

(A) N-(3-chloro-6-methoxyphenyl)-2,2,4-trichlorobutyramide

Following a procedure similar to that described in Example 2A and using 7.87 g. 3-chloro-6-methoxyaniline, 2.1 g. sodium hydroxide, and 10.5 g. 2,2,4-trichlorobutyryl chloride, there was obtained N-(3-chloro-6-methoxyphenyl)-2,2,4-trichlorobutyramide as a brown oil which was used as such in the next step.

(B) 3,3-dichloro-1-(2-chloro-6-methoxyphenyl)-2-pyrrolidinone

Following a procedure similar to that described in Example 2B and using the N-(3-chloro-6-methoxyphenyl)-2,2,4-trichlorobutyramide from Example 11A and 2.1 g. sodium hydroxide, there was obtained after recrystallization from methyl alcohol-water 9.7 g. 3,3-dichloro-1-(3-chloro-6-methoxyphenyl)-2-pyrrolidinone; M.P. 118–120° C.

EXAMPLE 12

(A) N-(4-benzyloxyphenyl)-2,2,4-trichlorobutyramide

Following a procedure similar to that described in Example 2A and using 10 g. 4-benzyloxyaniline, 2.1 g. sodium hydroxide, and 10.5 g. 2,2,4-trichlorobutyryl chloride, there was obtained N-(4-benzyloxyphenyl)-2,2,4-trichlorobutyramide as a solid which was used as such in the next step.

(B) 3,3-dichloro-1-(4-benzyloxyphenyl)-2-pyrrolidinone

Following a procedure similar to that described in Example 2B and using the N-(4-benzyloxyphenyl)-2,2,4-trichlorobutyramide from Example 12A and 2.1 g. sodium hydroxide, there was obtained after recrystallization from benzene-hexane 9.5 g. 3,3-dichloro-1-(4-benzyloxyphenyl)-2-pyrrolidinone; M.P. 163.5–165° C.

EXAMPLE 13

(A) N-(4-acetamidophenyl)-2,2,4-trichlorobutyramide

Following a procedure similar to that described in Example 2A and using 4.5 g. 4-acetamidoaniline, 1.3 g. sodium hydroxide, and 6.3 g. 2,2,4-trichlorobutyryl chloride, there was obtained N-(4-acetamidophenyl)-2,2,4-trichlorobutyramide as a solid which was used as such in the next step.

(B) 3,3-dichloro-1-(4-acetamiodophenyl)-2-pyrrolidinone

Following a procedure similar to that described in Example 2B and using the N-(4-acetamidophenyl)-2,2,4-trichlorobutyramide from Example 13A and 1.3 g. sodium hydroxide, there was obtained after recrystallization from methyl alcohol 4.1 g. 3,3-dichloro-1-(4-acetamidophenyl)-2-pyrrolidinone: M.P. 195–196° C. (dec.).

By treating 3,3-dichloro-1-(4-acetamidophenyl)-2-pyrrolidinone in absolute ethyl alcohol, at room temperature, with an ethereal solution containing an amount of hydrogen chloride slightly in excess of that required to hydrolyze the acetamido group, there can be obtained the hydrochloride salt of 3,3-dichloro-1-(4-aminophenyl)-2-pyrrolidinone which can be converted to the free base by dissolving the salt in ethyl alcohol and treating the resulting solution with an equivalent amount of sodium carbonate in water.

EXAMPLE 14

(A) N-(4-nitrophenyl)-2,2,4-trichlorobutyramide

Following a procedure similar to that described in Example 2A and using 6.9 g. 4-nitroaniline, (4.4 g. sodium bicarbonate, and 10.5 g. 2,2,4-trichlorobutyryl chloride, there was obtained N-(4-nitrophenyl)-2,2,4-trichlorobutyramide as yellow crystals which were used as such in the next step.

(B) 3,3-dichloro-1-(4-nitrophenyl)-2-pyrrolidinone

Following a procedure similar to that described in Example 2B and using the N-(4-nitrophenyl)-2,2,4-trichlorobutyramide from Example 14A and 2.1 g. sodium hydroxide, there was obtained after recrystallization from acetone-water 6.0 g. 3,3-dichloro-1-(4-nitrophenyl)-2-pyrrolidinone; M.P. 162–163° C.

EXAMPLE 15

(A) N-[4-(trifluoromethyl)phenyl]-2,2,4-trichlorobutyramide

Following a procedure similar to that described in Example 2A and using 8.05 g. 4-(trifluoromethyl)aniline, 4.4 g. sodium bicarbonate, and 10.5 g. 2,2,4-trichlorobutyryl chloride, there was obtained N-[4-(trifluoromethyl)phenyl]-2,2,4-trichlorobutyramide as yellow crystals which was used as such in the next step.

(B) 3,3-dichloro-1-[4-(trifluoromethyl)phenyl]-2-pyrrolidinone

Following a procedure similar to that described in Example 2B and using the N-[4-(trifluoromethyl)phenyl]-2,2,4-trichlorobutyramide from Example 15A and 2.1 g. sodium hydroxide there was obtained after recrystallization from methyl alcohol 6.4 g. 3,3-dichloro-1-[4-(trifluoromethyl)phenyl]-2-pyrrolidinone; M.P. 106–107° C.

EXAMPLE 16

(A) N-[2-(trifluoromethyl)phenyl]-2,2,4-trichlorobutyramide

Following a procedure similar to that described in Example 2A and using 8.05 g. (2-trifluoromethyl)aniline, 2.1 g. sodium hydroxide, and 10.5 g. 2,2,4-trichlorobutyryl chloride, there was obtained N-[2-(trifluoromethyl)phenyl]-2,2,4-trichlorobutyramide as a yellow oil which was used as such in the next step.

(B) 3,3-dichloro-1-[2-(trifluoromethyl)phenyl]-2-pyrrolidinone

A procedure was followed similar to that described in Example 2B, using the N-[2-(trifluoromethyl)phenyl]2,2,4-trichlorobutyramide from Example 16A and 2.1 g. sodium hydroxide, except that the reaction solution was diluted with water and extracted with benzene. Evaporation of the benzene extract to dryness yielded, after recrystallization from hexane, 4.0 g. 3,3-dichloro-1-[2-trifluoromethyl)phenyl]-2-pyrrolidinone; M.P. 64.5° C.

EXAMPLE 17

(A) N-(2-naphthyl)-2,2,4-trichlorobutyramide

To a stirred ice-cooled mixture of 7.16 g. of 2-naphthylamine in 150 ml. benzene and 5.63 g. sodium carbonate in water was added 10.5 g. 2,2,4-trichlorobutyryl chloride in 50 ml. benzene during one-half hour and stirring was continued one-half hour with cooling and one and one-half hours at room temperature. The benzene phase was separated, washed with dilute aqueous hydrochloric acid solution, water, dilute sodium bicarbonate solution and water, dried over calcium sulfate and evaporated to dryness to yield 15.9 g. N-(2-naphthyl)-2,2,4-trichlorobutyramide as a solid which was used as such in the next step.

(B) 3,3-dichloro-1-(2-naphthyl)-2-pyrrolidinone

To the N-(2-naphthyl)-2,2,4-trichlorobutyramide from Example 17A in 100 ml. ethyl alcohol was added, with stirring, a solution of 1.0 g. sodium hydroxide in 10 ml. water and when the pH of the reaction mixture returned to approximately seven an additional solution of 1.0 g. of sodium hydroxide in 10 ml. water was added. When the pH of the reaction mixture returned to approximately seven, it was adjusted to pH thirteen by the addition of 50% aqueous sodium hydroxide solution and stirring was continued for one hour. The reaction mixture was diluted with water and the resulting precipitate was collected by filtration and recrystallized from methyl alcohol to yield 11.0 g. 3,3-dichloro-1-(2-naphthyl)-2-pyrrolidinone; M.P. 163.5–164.5° C.

EXAMPLE 18

(A) N-(4-chloro-1-naphthyl)-2,2,4-trichlorobutyramide

Following a procedure similar to that described in Example 17A and using 8.88 g. 4-chloro-1-aminonaphthalene, 5.62 g. sodium carbonate and 10.5 g. 2,2,4-trichlorobutyryl chloride, there was obtained 16.6 g. N-(4-chloro-1-naphthyl)-2,2,4-trichlorobutyramide which was used as such in the next step.

(B) 3,3-dichloro-1-(4-chloro-1-naphthyl)-2-pyrrolidinone

Following a procedure similar to that described in Example 17B and using 16.6 g. N-(4-chloro-1-naphthyl)-2,2,4-trichlorobutyramide from Example 18A and 1.48 g. sodium hydroxide, there was obtained after recrystallization from methyl alcohol 11.9 g. 3,3-dichloro-1-(4-chloro-1-naphthyl)-2-pyrrolidinone; M.P. 211.9–220° C.

EXAMPLE 19

(A) N-(1-naphthyl)-2,2,4-trichlorobutyramide

Following a procedure similar to that described in Example 17A and using 7.15 g. 1-naphthylamine, 2.1 g. sodium hydroxide, and 10.5 g. 2,2,4-trichlorobutyryl chloride, there was obtained N-(1-naphthyl)-2,2,4-trichlorobutyramide as a brown gum which was used as such in the next step.

(B) 3,3-dichloro-1-(1-naphthyl)-2-pyrrolidinone

Following a procedure similar to that described in Example 17B and using the N-(1-naphthyl)-2,2,4-trichlorobutyramide from Example 19A and 2.1 g. sodium hydroxide, there was obtained after recrystallization from methyl alcohol 9.05 g. 3,3-dichloro-1-(1-naphthyl)-2-pyrrolidinone; M.P. 150–151° C.

Following a procedure similar to that described in Example 17A and substituting for 2-naphthylamine an equivalent amount of:

(a) 1-amino-2-bromo-4,7-dinitronaphthalene
(b) 1-amino-2-methoxy-6-methylsulfonylnaphthalene
(c) 1-amino-2-phenethyloxynaphthalene
(d) 1-amino-2-phenoxynaphthalene
(e) 2-amino-1-methylmercaptonaphthalene
(f) 1-amino-5-hexyloxynaphthalene
(g) 1-amino-3-benzylnaphthalene
(h) 1-amino-2-(trifluoromethyl)naphthalene
(i) 1-amino-2,4-dimethylnaphthalene
(j) 1-amino-8-bromonaphthalene
(k) 2-amino-6-tert-butylnaphthalene
(l) 2-amino-3-bromo-5,6,7,8-tetrahydronaphthalene
(m) 1-amino-4-dimethylaminonaphthalene
(n) 2-acetamido-6-aminonaphthalene there can be obtained respectively, according to this invention:

(a) N-(2-bromo-4,7-dinitro-1-naphthyl)-2,2,4-trichlorobutyramide
(b) N-(2-methoxy-6-methylsulfonyl-1-naphthyl)-2,2,4-trichlorobutyramide
(c) N-(2-phenethyloxy-1-naphthyl)-2,2,4-trichlorobutyramide
(d) N-(2-phenoxy-1-naphthyl)-2,2,4-trichlorobutyramide
(e) N-(1-methylmercapto-2-naphthyl)-2,2,4-trichlorobutyramide
(f) N-(5-hexyloxy-1-naphthyl)-2,2,4-trichlorobutyramide
(g) N-(3-benzyl-1-naphthyl)-2,2,4-trichlorobutyramide
(h) N-[2-(trifluoromethyl)-1-naphthyl]-2,2,4-trichlorobutyramide
(i) N-(2,4-dimethyl-1-naphthyl)-2,2,4-trichlorobutyramide
(j) N-(8-bromo-1-naphthyl)-2,2,4-trichlorobutyramide
(k) N-(6-tert-butyl-2-naphthyl)-2,2,4-trichlorobutyramide
(l) N-(3-bromo-5,6,7,8-tetrahydro-2-naphthyl)-2,2,4-trichlorobutyramide
(m) N-(4-dimethylamino-1-naphthyl)-2,2,4-trichlorobutyramide
(n) N-(2-acetamido-6-naphthyl)-2,2,4-trichlorobutyramide Following a procedure similar to that described in Example 17B and substituting for N-(2-naphthyl)-2,2,4-trichlorobutyramide an equivalent amount of:

(a) N-(2-bromo-4,7-dinitro-1-naphthyl)-2,2,4-trichlorobutyramide
(b) N-(2-methoxy-6-methylsulfonyl-1-naphthyl)-2,2,4-trichlorobutyramide
(c) N-(2-phenethyloxy-1-naphthyl)-2,2,4-trichlorobutyramide
(d) N-(2-phenoxy-1-naphthyl)-2,2,4-trichlorobutyramide
(e) N-(1-methylmercapto-2-naphthyl)-2,2,4-trichlorobutyramide
(f) N-(5-hexyloxy-1-naphthyl)-2,2,4-trichlorobutyramide
(g) N-(3-benzyl-1-naphthyl)-2,2,4-trichlorobutyramide
(h) N-[2-(trifluoromethyl)-1-naphthyl]-2,2,4-trichlorobutyramide
(i) N-(2,4-dimethyl-1-naphthyl)-2,2,4-trichlorobutyramide
(j) N-(8-bromo-1-naphthyl)-2,2,4-trichlorobutyramide
(k) N-(6-tert-butyl-2-naphthyl)-2,2,4-trichlorobutyramide
(l) N-(3-bromo-5,6,7,8-tetrahydro-2-naphthyl)-2,2,4-trichlorobutyramide
(m) N-(4-dimethylamino-1-naphthyl)-2,2,4-trichlorobutyramide
(n) N-(2-acetamido-6-naphthyl)-2,2,4-trichlorobutyramide there can be obtained respectively, according to this invention:

(a) 3,3-dichloro-1-(2-bromo-4,7-dinitro-1-naphthyl)-2-pyrrolidinone
(b) 3,3-dichloro-1-(2-methoxy-6-methylsulfonyl-1-naphthyl)-2-pyrrolidinone
(c) 3,3-dichloro-1-(2-phenethyloxy-1-naphthyl)-2-pyrrolidinone
(d) 3,3-dichloro-1-(2-phenoxy-1-naphthyl)-2-pyrrolidinone
(e) 3,3-dichloro-1-(1-methylmercapto-2-naphthyl)-2-pyrrolidinone
(f) 3,3-dichloro-1-(5-hexyloxy-1-naphthyl)-2-pyrrolidinone
(g) 3,3-dichloro-1-(3-benzyl-1-naphthyl)-2-pyrrolidinone
(h) 3,3-dichloro-1-[2-(trifluoromethyl)-1-naphthyl]-2-pyrrolidinone
(i) 3,3-dichloro-1-(2,4-dimethyl-1-naphthyl)-2-pyrrolidinone
(j) 3,3-dichloro-1-(8-bromo-1-naphthyl)-2-pyrrolidinone
(k) 3,3-dichloro-1-(6-tert-butyl-2-naphthyl)-2-pyrrolidinone
(l) 3,3-dichloro-1-(3-bromo-5,6,7,8-tetrahydro-2-naphthyl)-2-pyrrolidinone
(m) 3,3-dichloro-1-(4-dimethylamino-1-naphthyl)-2-pyrrolidinone
(n) 3,3-dichloro-1-(2-acetamido-6-naphthyl)-2-pyrrolidinone

EXAMPLE 20

(A) N-(2,6-xylyl)-2,2,4-trichlorobutyramide

To a stirred ice-cooled mixture of 6.06 g. 2,6-dimethylaniline in 100 ml. benzene and 5.62 g. sodium carbonate in 50 ml. water was added 10.5 g. 2,2,4-trichlorobutyryl chloride in 50 ml. benzene during one-half hour and stirring was continued one-half hour with cooling and one and one-half hours at room temperature. The benzene phase was separated, washed with dilute aqueous hydrochloric acid solution, water, dilute sodium bicarbonate solution and water, dried over calcium sulfate and evaporated to dryness to yield after recrystallization from hexane 12.8 g. N-(2,6-xylyl)-2,2,4-trichlorobutyramide; M.P. 119.0–120.0° C.

(B) 3,3-dichloro-1-(2,6-xylyl)-2-pyrrolidinone

To 12.8 g. N - (2,6-xylyl)-2,2,4-trichlorobutyramide from Example 20A in 100 ml. ethyl alcohol was added, with stirring, a solution of 0.8 g. sodium hydroxide in 10 ml. water and when the pH of the reaction mixture returned to approximately seven an additional 0.8 g. sodium hydroxide in 10 ml. water was added. When the pH of the reaction mixture returned to approximately seven, it was adjusted to pH thirteen by the addition of 50% aqueous sodium hydroxide solution and stirring was continued for one hour. The reaction mixture was diluted with water and the resulting precipitate was collected by filtration and recrystallized from methyl alcohol-water to yield 8.7 g. 3,3-dichloro-1-(2,6-xylyl)-2-pyrrolidinone; M.P. 96.5–98.0° C.

EXAMPLE 21

(A) N-(2,4-difluorophenyl)-2,2,4-trichlorobutyramide

Following a procedure similar to that described in Example 20A and using 6.46 g. 2,4-difluoroaniline, 5.62 g. sodium carbonate, and 10.5 g. 2,2,4-trichlorobutyryl chloride, there was obtained 13.6 g. N-(2,4-difluorophenyl)-2,2,4-trichlorobutyramide as an oil which was used as such in the next step.

(B) 3,3-dichloro-1-(2,4-difluorophenyl)-2-pyrrolidinone

Following a procedure similar to that described in Example 20B and using 13.6 g. N-(2,4-difluorophenyl)-2,2,4-trichlorobutyramide from Example 21A and 1.80 g. sodium hydroxide, there was obtained after recrystallization from ethyl acetate-hexane 6.43 g. 3,3-dichloro-1-(2,4-difluorophenyl)-2-pyrrolidinone; M.P. 86–87° C.

EXAMPLE 22

(A) N-[3-(phenoxy)phenyl]-2,2,4-trichlorobutyramide

Following a procedure similar to that described in Example 20A and using 9.26 g. 3-phenoxyaniline, 5.62 g. sodium carbonate, and 10.5 g. 2,2,4-trichlorobutyryl chloride, there was obtained 16.4 g. N-[3-(phenoxy)phenyl]-2,2,4-trichlorobutyramide as an oil which was used as such in the next step.

(B) 3,3-dichloro-1-[3-(phenoxy)phenyl]-2-pyrrolidinone

Following a procedure similar to that described in Example 20B and using 16.4 g. N-[3-(phenoxy)phenyl]-2,2,4-trichlorobutyramide from Example 22A and 3.83 g. sodium hydroxide, there was obtained after recrystallization from methyl alcohol-water 12.2 g. 3,3-dichloro-1-[3-(phenoxy)phenyl]-2-pyrrolidinone; M.P. 89.5–90.5° C.

EXAMPLE 23

(A) N-[4-chloro-2-(trifluoromethyl)phenyl]-2,2,4-trichlorobutyramide

Following a procedure similar to that described in Example 20A and using 9.78 g. 4-chloro-2-(trifluoromethyl)aniline, 5.62 g. sodium carbonate, and 10.5 g. 2,2,4-trichlorobutyryl chloride, there was obtained N-[4-chloro - 2 - (trifluoromethyl)phenyl] - 2,2,4 - trichlorobutyramide as crystals which were used as such in the next step.

(B) 3,3-dichloro-1-[4-chloro-2-(trifluoromethyl)phenyl]-2-pyrrolidinone

Following a procedure similar to that described in Example 20B and using the N-[4-chloro-2-(trifluoromethyl)phenyl]-2,2,4-trichlorobutyramide from Example 23A and 2.0 g. sodium hydroxide, there was obtained after recrystallization from hexane 7.97 g. 3,3-dichloro-1-[4-chloro-2-(trifluoromethyl)phenyl]-2-pyrrolidinone; M.P. 78–80° C.

EXAMPLE 24

(A) N-[3,5-bis(trifluoromethyl)phenyl]-2,2,4-trichlorobutyramide

Following a procedure similar to that described in Example 20A and using 11.5 g. 3,5-bis(trifluoromethyl) aniline, 5.62 g. sodium carbonate, and 10.5 g. 2,2,4-trichlorobutyryl chloride, there was obtained 19.9 g. N-[3,5-bis(trifluoromethyl)phenyl]-2,2,4-trichlorobutyramide as a solid which was used as such in the next step.

(B) 3,3 - dichloro-1-[3,5-bis(trifluoromethyl)phenyl]-2-pyrrolidinone

Following a procedure similar to that described in Example 20B and using the N-[3,5-bis(trifluoromethyl)-phenyl]-2,2,4-trichlorobutyramide from Example 24A and 1.98 g. sodium hydroxide, there was obtained after recrystallization from methyl alcohol-water 8.19 g. 3,3-dichloro - 1 - [3,5-bis(trifluoromethyl)phenyl]-2-pyrrolidinone; M.P. 88–90° C.

EXAMPLE 25

(A) N-(3,4-dichlorophenyl)-2,2,4-trichlorobutyramide

Following a procedure similar to that described in Example 20A and using 8.10 g. 3,4-dichloroaniline, 5.62 g. sodium carbonate, and 10.5 g. 2,2,4-trichlorobutyryl chloride, there was obtained after crystallization from hexane 14.1 g. N-(3,4-dichlorophenyl)-2,2,4-trichlorobutyramide; M.P. 60.0–61.5° C.

(B) 3,3 - dichloro-1-(3,4-dichlorophenyl)-2-pyrrolidinone

Following a procedure similar to that described in Example 20B and using 13.4 g. N-(3,4-dichlorophenyl)-2,2,4-trichlorobutyramide from Example 25A and 1.60 g. sodium hydroxide, there was obtained after recrystallization from methyl alcohol-water 9.0 g. 3,3-dichloro-1-(3,4 - dichlorophenyl) - 2 - pyrrolidinone; M.P. 114.5–115.5° C.

EXAMPLE 26

(A) N-(2,6-dimethyl-3-pyridyl)-2,2,4-trichlorobutyramide

To a stirred, ice-cooled mixture of 6.1 g. 3-amino-2,6-dimethylpyridine in 125 ml. ethylene dichloride and 4.2 g. sodium bicarbonate in 50 ml. water was added 10.5 g. 2,2,4-trichlorobutyryl chloride in 25 ml. ethylene dichloride during one-half hour and stirring was continued one-half hour. The ethylene dichloride phase was washed with dilute aqueous sodium bicarbonate solution and water and the ethylene dichloride layer was then extracted with one normal aqueous hydrochloric acid solution and water. The aqueous acidic solution was treated with aqueous sodium bicarbonate solution until neutral and the resulting oily precipitate was taken up in ether and the ethereal solution was dried over calcium sulfate and evaporated to dryness. The resulting oil, dissolved in acetone, was treated with one equivalent of hydrogen chloride in ethyl alcohol to yield after recrystallization from ethyl alcohol-acetone 8.1 g. of the hydrochloride of N-(2,6-dimethyl - 3 - pyridyl)-2,2,4-trichlorobutyramide; M.P. 180–181° C. (dec.).

(B) 3,3-dichloro-1-(2,6-dimethyl-3-pyridyl)-2-pyrrolidinone

To a stirred solution of 5 g. of the hydrochloride of N - (2,6 - dimethyl-3-pyridyl)-2,2,4-trichlorobutyramide from Example 26A in 30 ml. ethyl alcohol was added a solution of 1.2 g. sodium hydroxide in 12 ml. water in small portions during twenty minutes and stirring was continued for one-half hour. The reaction solution was diluted with water and the resulting precipitate was collected by filtration and recrystallized from methyl-alcohol-water to yield 1.12 g. 3,3-dichloro-1-(2,6-dimethyl-3-pyridyl)-pyrrolidinone; M.P. 87.8–89.8° C. (corr).

EXAMPLE 27

(A) N-(2-chloro-3-pyridyl)-2,2,4-trichlorobutyramide

A procedure was followed similar to that described in Example 26A using benzene instead of ethylene dichloride, 6.43 g. 3-amino-2-chloropyridine, 5.62 g. sodium carbonate, and 10.5 g. 2,2,4-trichlorobutyryl chloride, except that the benzene phase was washed only with water and then evaporated to dryness to yield 14.8 g. N-(2-chloro-3-pyridyl)-2,2,4 - trichlorobutyramide as crystals which were used as such in the next step.

(B) 3,3-dichloro-1-(2-chloro-3-pyridyl)-2-pyrrolidinone

Following a procedure similar to that described in Example 26B and using 14.8 g. N-(2-chloro-3-pyridyl)-2,2,4-trichlorobutyramide from Example 27A and 1.96 g. sodium hydroxide there was obtained after recrystallization from methyl alcohol 8.1 g. 3,3-dichloro-1-(2-chloro-3-pyridyl)-2-pyrrolidinone; M.P. 128–130° C.

Following a procedure similar to that described in Example 26A and substituting for 3-amino-2,6-dimethylpyridine an equivalent amount of:

(a) 2-aminopyridine
(b) 3-aminopyridine
(c) 4-aminopyridine
(d) 5-amino-2-dimethylaminopyridine
(e) 2-amino-6-hexylpyridine
(f) 3-amino-6-ethoxy-2-methylmercaptopyridine
(g) 3-amino-4-phenethylpyridine
(h) 5-amino-2-benzyloxypyridine
(i) 4-amino-2,3-dichloro-6-(trichloromethyl)pyridine
(j) 5-amino-2-n-butylmercapto-3-nitropyridine
(k) 3-amino-5-chloro-2-phenoxypyridine
(l) 2-amino-5-tert-butylpyridine
(m) 2-amino-3,5,6-trifluoropyridine
(n) 5-amino-2-(n-butylsulfonyl)pyridine
(o) 2-acetamido-6-aminopyridine there can be obtained respectively, according to this invention:

(a) N-(2-pyridyl)-2,2,4-trichlorobutyramide
(b) N-(3-pyridyl)-2,2,4-trichlorobutyramide
(c) N-(4-pyridyl)-2,2,4-trichlorobutyramide
(d) N-(2-dimethylamino-5-pyridyl)-2,2,4-trichlorobutyramide
(e) N-(6-hexyl-2-pyridyl)-2,2,4-trichlorobutyramide
(f) N-(6-ethoxy-2-methylmercapto-3-pyridyl)-2,2,4-trichlorobutyramide
(g) N-(4-phenethyl-3-pyridyl)-2,2,4-trichlorobutyramide
(h) N-(2-benzyloxy-5-pyridyl)-2,2,4-trichlorobutyramide
(i) N-[2,3-dichloro-6-(trichloromethyl)-4-pyridyl]-2,2,4-trichlorobutyramide
(j) N-(2-n-butylmercapto-3-nitro-5-pyridyl)-2,2,4-trichlorobutyramide
(k) N-(5-chloro-2-phenoxy-3-pyridyl)-2,2,4-trichlorobutyramide
(l) N-(5-tert-butyl-2-pyridyl)-2,2,4-trichlorobutyramide
(m) N-(3,5,6-trifluoro-2-pyridyl)-2,2,4-trichlorobutyramide
(n) N-(2-n-butylsulfonyl-5-pyridyl)-2,2,4-trichlorobutyramide
(o) N-(2-acetamido-6-pyridyl)-2,2,4-trichlorobutyramide Following a procedure similar to that described in Example 26B and substituting for N-(2,6-dimethyl-3-pyridyl)-2,2,4-trichlorobutyramide an equivalent amount of:

(a) N-(2-pyridyl)-2,2,4-trichlorobutyramide
(b) N-(3-pyridyl)-2,2,4-trichlorobutyramide
(c) N-(4-pyridyl)-2,2,4-trichlorobutyramide
(d) N-(2-dimethylamino-5-pyridyl)-2,2,4-trichlorobutyramide
(e) N-(6-hexyl-2-pyridyl)-2,2,4-trichlorobutyramide
(f) N-(6-ethoxy-2-methylmercapto-3-pyridyl)-2,2,4-trichlorobutyramide
(g) N-(4-phenethyl-3-pyridyl)-2,2,4-trichlorobutyramide
(h) N-(2-benzyloxy-5-pyridyl)-2,2,4-trichlorobutyramide
(i) N-[2,3-dichloro-6-(trichloromethyl)-4-pyridyl]-2,2,4-trichlorobutyramide
(j) N-(2-n-butylmercapto-3-nitro-5-pyridyl)-2,2,4-trichlorobutyramide
(k) N-(5-chloro-2-phenoxy-3-pyridyl)-2,2,4-trichlorobutyramide
(l) N-(5-tert-butyl-2-pyridyl)-2,2,4-trichlorobutyramide
(m) N-(3,5,6-trifluoro-2-pyridyl)-2,2,4-trichlorobutyramide
(n) N-(2-n-butylsulfonyl-5-pyridyl)-2,2,4-trichlorobutyramide
(o) N-(2-acetamido-6-pyridyl)-2,2,4-trichlorobutyramide there can be obtained respectively, according to this invention:

(a) 3,3-dichloro-1-(2-pyridyl)-2-pyrrolidinone
(b) 3,3-dichloro-1-(3-pyridyl)-2-pyrrolidinone
(c) 3,3-dichloro-1-(4-pyridyl)-2-pyrrolidinone
(d) 3,3-dichloro-1-(2-dimethylamino-5-pyridyl)-2-pyrrolidinone
(e) 3,3-dichloro-1-(6-hexyl-2-pyridyl)-2-pyrrolidinone
(f) 3,3-dichloro-1-(6-ethoxy-2-methylmercapto-3-pyridyl)-2-pyrrolidinone
(g) 3,3-dichloro-1-(4-phenethyl-3-pyridyl)-2-pyrrolidinone
(h) 3,3-dichloro-1-(2-benzyloxy-5-pyridyl)-2-pyrrolidinone
(i) 3,3-dichloro-1-[2,3-dichloro-6-(trichloromethyl)-4-pyridyl]-2-pyrrolidinone
(j) 3,3-dichloro-1-(2-n-butylmercapto-3-nitro-pyridyl)-2-pyrrolidinone
(k) 3,3-dichloro-1-(5-chloro-2-phenoxy-3-pyridyl)-2-pyrrolidinone
(l) 3,3-dichloro-1-(5-tert-butyl-2-pyridyl)-2-pyrrolidinone
(m) 3,3-dichloro-1-(3,5,6-trifluoro-2-pyridyl)-2-pyrrolidinone
(n) 3,3-dichloro-1-(2-n-butylsulfonyl-5-pyridyl)-2-pyrrolidinone
(o) 3,3-dichloro-1-(2-acetamido-6-pyridyl)-2-pyrrolidinone By treating 3,3-dichloro-1-(2-acetamido-6- pyridyl)-2-pyrrolidinone in absolute ethyl alcohol, at room temperature, with an ethereal solution containing an amount of hydrogen chloride slightly in excess of that required to hydrolyze the acetamido group, there can be obtained the dihydrochloride salt of 3,3 - dichloro - 1 - (2 - amino - 6-pyridyl)-2-pyrrolidinone which can be converted to the free base by dissolving the salt in ethyl alcohol and treating the resulting solution with an equivalent of sodium carbonate in water.

EXAMPLE 28

(A) N-(5-chloro-2-pyridyl)-2,2,4-trichlorobutyramide

Following a procedure similar to that described for Example 26A and using 11.9 g. 2-amino-5-chloropyridine, 6.42 g. sodium carbonate, and 10.5 g. 2,2,4-trichlorobutyryl chloride, there was obtained 11.9 g. N-(5-chloro- 2-pyridyl)-2,2,4-trichlorobutyramide an crystals which was used as such in the next step.

(B) 3,3-dichloro-1-(5-chloro-2-pyridyl)-2-pyrrolidinone

Following a procedure similar to that described in Example 26B and using 11.9 g. N-(5-chloro-2-pyridyl)-2,2,4-trichlorobutyramide from Example 28A and 1.58 g. sodium hydroxide, there was obtained after recrystallization from methyl alcohol 3.56 g. 3,3-dichloro-1-(5-chloro-2-pyridyl)-2-pyrrolidinone; M.P. 106–107° C.

EXAMPLE 29

(A) N-(4-chloro-2-benzothiazolyl)-2,2,4-trichlorobutyramide

To a stirred ice-cooled mixture of 9.2 g. 2-amino-4-chlorobenzothiazole in 700 ml. ethylene dichloride and 5.63 g. sodium carbonate in 100 ml. water was added a solution of 10.5 g. 2,2,4-trichlorobutyryl chloride in 50 ml. ethylene dichloride dropwise during twenty minutes. Stirring was continued for two hours at room temperature and the ethylene dichloride phase was separated and washed with water, dried over sodium sulfate, and evaporated to dryness to yield, after recrystallization from methyl alcohol-acetone-water, 13.6 g. N-(4-chloro-2-benzothiazolyl) - 2,2,4 - trichlorobutyramide; M.P. 150–155° C.

(B) 3,3-dichloro-1-(4-chloro-2-benzothiazolyl)-2-pyrrolidinone

To a stirred solution of 13.6 g. N-(4-chloro-2-benzothiazolyl)-2,2,4-trichlorobutyramide from Example 29A in 400 ml. methyl alcohol at room temperature was added a solution of 1.53 g. sodium hydroxide in 10 ml. water dropwise. The pH of the mixture was adjusted to seven by the addition of a few drops 1 N aqueous hydrochloric acid solution and stirring was continued for five minutes. The mixture was diluted with 30 ml. water and the precipitate was collected by filtration and recrystallized from benzene-methyl alcohol to yield 9.36 g. 3,3-dichloro-1-(4-chloro-2-benzothiazolyl)-2-pyrrolidinone; M.P. 208–209° C.

Following a procedure similar to that described in Example 29A and substituting for 2-amino-4-chlorobenzothiazole an equivalent amount of:

(a) 2-aminobenzothiazole
(b) 4-aminobenzothiazole
(c) 5-aminobenzothiazole
(d) 6-aminobenzothiazole
(e) 7-aminobenzothiazole
(f) 2-amino-6-n-butoxybenzothiazole
(g) 2-amino-5,7-dichloro-4-methoxybenzothiazole
(h) 2-amino-6-ethylmercaptobenzothiazole
(i) 6-amino-2-phenoxybenzothiazole
(j) 6-amino-2-dimethylaminobenzothiazole
(k) 2-amino-6-(trifluoromethyl)benzothiazole
(l) 2-amino-4-bromo-6-methylsulfonylbenzothiazole
(m) 5-amino-2-methyl-4-nitrobenzothiazole
(n) 2-acetamido-6-aminobenzothiazole there can be obtained respectively, according to this invention:

(a) N-(2-benzothiazolyl)-2,2,4-trichlorobutyramide
(b) N-(4-benzothiazolyl)-2,2,4-trichlorobutyramide
(c) N-(5-benzothiazolyl)-2,2,4-trichlorobutyramide
(d) N-(6-benzothiazolyl)-2,2,4-trichlorobutyramide
(e) N-(7-benzothiazolyl)-2,2,4-trichlorobutyramide
(f) N-(6-n-butoxy-2-benzothiazolyl)-2,2,4-trichlorobutyramide
(g) N-(5,7-dichloro-4-methoxy-2-benzothiazolyl)-2,2,4-trichlorobutyramide
(h) N-(6-ethylmercapto-2-benzothiazolyl)-2,2,4-trichlorobutyramide
(i) N-(2-phenoxy-6-benzothiazolyl)-2,2,4-trichlorobutyramide
(j) N-(2-dimethylamino-6-benzothiazolyl)-2,2,4-trichlorobutyramide
(k) N[6-(trifluoromethyl)-2-benzothiazolyl]2,2,4-trichlorobutyramide
(l) N-(4-bromo-6-methylsulfonyl-2-benzothiazolyl)-2,2,4-trichlorobutyramide
(m) N-(2-methyl-4-nitro-5-benzothiazolyl)-2,2,4-trichlorobutyramide
(n) N-(2-acetamido-6-benzothiazolyl)-2,2,4-trichlorobutyramide Following a procedure similar to that described in Example 29B and substituting for N-(4-chloro-2-benzothiazolyl) - 2,2,4 - trichlorobutyramide an equivalent amount of:

(a) N-(2-benzothiazolyl)-2,2,4-trichlorobutyramide
(b) N-(4-benzothiazolyl)-2,2,4-trichlorobutyramide
(c) N-(5-benzothiazolyl)-2,2,4-trichlorobutyramide
(d) N-(6-benzothiazolyl)-2,2,4-trichlorobutyramide
(e) N-(7-benzothiazolyl)-2,2,4-trichlorobutyramide
(f) N-(6-n-butoxy-2-benzothiazolyl)-2,2,4-trichlorobutyramide
(g) N-(5,7-dichloro-4-methoxy-2-benzothiazolyl)-2,2,4-trichlorobutyramide
(h) N-(6-ethylmerctpo-2-benzothiazolyl)-2,2,4-trichlorobutyramide
(i) N-(2-phenoxy-6-benzothiazolyl)-2,2,4-trichlorobutyramide
(j) N-(2-dimethylamino-6-benzothiazolyl)-2,2,4-trichlorobutyramide
(k) N-[6-(trifluoromethyl)-2-benzothiazolyl]-2,2,4-trichlorobutyramide
(l) N-(4-bromo-6-methylsulfonyl-2-benzothiazolyl)-2,2,4-trichlorobutyramide
(m) N-(2-methyl-4-nitro-5-benzothiazolyl)-2,2,4-trichlorobutyramide
(n) N-(2-acetamido-6-benzothazolyl)-2,2,4-trichlorobutyramide there can be obtained respectively, according to this invention:

(a) 3,3-dichloro-1-(2-benzothiazolyl)-2-pyrrolidinone
(b) 3,3-dichloro-1-(4-benzothiazolyl)-2-pyrrolidinone
(c) 3,3-dichloro-1-(5-benzothiazolyl)-2-pyrrolidinone
(d) 3,3-dichloro-1-(6-benzothiazolyl)-2-pyrrolidinone
(e) 3,3-dichloro-1-(7-benzothiazolyl)-2-pyrrolidinone
(f) 3,3-dichloro-1-(6-n-butoxy-2-benzothiazolyl)-2-pyrrolidinone
(g) 3,3-dichloro-1-(5,7-dichloro-4-methoxy-2-benzothiazolyl)-2-pyrrolidinone
(h) 3,3-dichloro-1-(6-ethylmercapto-2-benzothiazolyl)-2-pyrrolidinone
(i) 3,3-dichloro-1-(2-phenoxy-6-benzothiazolyl)-2-pyrrolidinone
(j) 3,3-dichloro-1-(2-dimethylamino-6-benzothiazolyl)-2-pyrrolidinone
(k) 3,3-dichloro-1-[6-(trifluoromethyl)-2-benzothiazolyl]-2-pyrrolidinone
(l) 3,3-dichloro-1-(4-bromo-6-methylsulfonyl-2-benzothiazolyl)-2-pyryolidinone
(m) 3,3-dichloro-1-(2-methyl-4-nitro-5-benzothiazolyl)-2-pyrrolidinone
(n) 3,3-dichloro-(2-acetamido-6-benzothiazolyl)-2-pyrrolidinone By treating 3,3-dichloro-1-(2-acetamido - 6 - benzothiazolyl)-2-pyrrolidinone in absolute ethyl alcohol, at room temperature, with an ethereal solution containing an amount of hydrogen chloride slightly in excess of that required to hydrolyze the acetamido group, there can be obtained the hydrochloride salt of 3,3-dichloro-1 - (2-amino-6-benzothiazolyl)-2-pyrrolidinone which can be converted to the free base by dissolving the salt in ethyl alcohol and treating the resulting solution with an equivalent amount of sodium carbonate in water.

EXAMPLE 30

(A) N-(9-oxo-1-fluorenyl)-2,2,4-trichlorobutyramide

To a stirred mixture of 5.65 g. 1-amino-9-fluorenone in 500 ml. ethylene dichloride and 3.83. g. sodium carbonate in 100 ml. water, at room temperature, was added a solution of 6.12 g. 2,2,4-trichlorobutyryl chloride in 50 ml. ethylene dichloride dropwise during twenty minutes. Stirring was continued for sixteen hours and the ethylene dichloride phase was separated and washed with water, dried over sodium sulfate, and evaporated to dryness to yield 10.5 g. N-(9-oxo-1-fluorenyl)-2,2,4-trichlorobutyramide; M.P. 143–145° C.

(B) 3,3-dichloro-1-(9-oxo-1-fluorenyl)-2-pyrrolidinone)

To a stirred solution of 9.5 g. N-9-(oxo-1-fluorenyl)-2,2,4-trichlorobutyramide from Example 30A in 300 ml. methyl alcohol-methylene dichloride (prepared by dissolving the amide in 150 ml. refluxing methylene dichloride, adding 200 ml. methyl alcohol, and concentrating the resulting solution to 300 ml.), at room temperature, was added a solution of 1.0 g. sodium hydroxide in 5 ml. water dropwise during five minutes. The reaction mixture was concentrated by evaporation to remove the methylene dichloride and diluted with water to yield after recrystallization from methylene dichloride-methanol 6.8 g. 3,3-dichloro-1-(9-oxo-1-fluorenyl)-2-pyrrolidinone; M.P. 160–161° C.

Following a procedure similar to that described in Example 30A and substituting for 1-amino-9-fluorenone an equivalent amount of:

(a) 1-aminofluorene
(b) 2-aminofluorene
(c) 3-aminofluorene
(d) 4-aminofluorene
(e) 3-amino-2-dimethylaminofluoren-9-one
(f) 2-amino-1,3-dibromo-7-nitrofluorene
(g) 2-amino-7-methylsulfonylfluorene
(h) 1-amino-2-methoxyfluorene
(i) 7-amino-3-methyl-2-nitrofluoren-9-one
(j) 2-amino-3-bromo-6,7-dichlorofluoren-9-one
(k) 2-amino-7-benzylfluorene
(l) 2-acetamido-3-aminofluorene there can be obtained respectively, according to this invention:

(a) N-(1-fluorenyl)-2,2,4-trichlorobutyramide
(b) N-(2-fluorenyl)-2,2,4-trichlorobutyramide
(c) N-(3-fluorenyl)-2,2,4-trichlorobutyramide
(d) N-(4-fluorenyl)-2,2,4-trichlorobutyramide
(e) N-(2-diethylamino-9-oxo-3-fluorenyl)-2,2,4-trichlorobutyramide
(f) N-(1,3-dibromo-7-nitro-2-fluorenyl)-2,2,4-trichlorobutyramide
(g) N-(7-methylsulfonyl-2-fluorenyl)-2,2,4-trichlorobutyramide
(h) N-(2-methoxy-1-fluorenyl)-2,2,4-trichlorobutyramide
(i) N-(3-methyl-2-nitro-9-oxo-7-fluorenyl)-2,2,4-trichlorobutyramide
(j) N-(3-bromo-6,7-dichloro-9-oxo-2-fluorenyl)-2,2,4-trichlorobutyramide
(k) N-(7-benzyl-2-fluorenyl)-2,2,4-trichlorobutyramide
(l) N-(2-acetamido-3-fluorenyl)-2,2,4-trichlorobutyramide Following a procedure similar to that described in Example 30B and substituting for N-(9-oxo-1-fluorenyl)-2,2,4-trichlorobutyramide an equivalent amount of:

(a) N-(1-fluorenyl)-2,2,4-trichlorobutyramide
(b) N-(2-fluorenyl)-2,2,4-trichlorobutyramide
(c) N-(3-fluorenyl)-2,2,4-trichlorobutyramide
(d) N-(4-fluorenyl)-2,2,4-trichlorobutyramide
(e) N-(2-diethylamino-9-oxo-3-fluorenyl)-2,2,4-trichlorobutyramide
(f) N-(1,3-dibromo-7-nitro-2-fluorenyl)-2,2,4-trichlorobutyramide
(g) N-(7-methylsulfonyl-2-fluorenyl)-2,2,4-trichlorobutyramide
(h) N-(2-methoxy-1-fluorenyl)-2,2,4-trichlorobutyramide
(i) N-(3-methyl-2-nitro-9-oxo-7-fluorenyl)-2,2,4-trichlorobutyramide
(j) N-(3-bromo-6,7-dichloro-9-oxo-2-fluorenyl)-2,2,4-trichlorobutyramide
(k) N-(7-benzyl-2-fluorenyl)-2,2-trichlorobutyramide
(l) N-(2-acetamido-3-fluorenyl)-2,2,4-trichlorobutyramide there can be obtained respectively, according to this invention:

(a) 3,3-dichloro-1-(1-fluorenyl)-2-pyrrolidinone
(b) 3,3-dichloro-1-(2-fluorenyl)-2-pyrrolidinone
(c) 3,3-dichloro-1-(3-fluorenyl)-2-pyrrolidinone
(d) 3,3-dichloro-1-(4-fluorenyl)-2-pyrrolidinone
(e) 3,3-dichloro-1-(2-diethylamino-9-oxo-3-fluorenyl)-2-pyrrolidinone
(f) 3,3-dichloro-1-(1,3-dibromo-7-nitro-2-fluorenyl)-2-pyrrolidinone
(g) 3,3-dichloro-1-(7-methylsulfonyl-2-fluorenyl)-2-pyrrolidinone
(h) 3,3-dichloro-1-(2-methoxy-fluorenyl)-2-pyrrolidinone
(i) 3,3-dichloro-1-(3-methyl-2-nitro-9-oxo-7-fluorenyl)-2-pyrrolidinone
(j) 3,3-dichloro-1-(3-bromo-6,7-dichloro-9-oxo-2-fluorenyl)-2-pyrrolidinone
(k) 3,3-dichloro-1-(7-benzyl-2-fluorenyl)-2-pyrrolidinone
(l) 3,3-dichloro-1-(2-acetamido-3-fluorenyl)-2-pyrrolidinone

EXAMPLE 31

(A) N-(5,6,7,8-tetrahydro-1-naphthyl)-2,2,4-trichlorobutyramide

To a stirred ice-cooled solution of 7.35 g. 5,6,7,8-tetrahydro-1-naphthylamine in 250 ml. methylene dichloride and 5.6 g. triethylamine was added 11.6 g. 2,2,4-trichlorobutyryl chloride in 40 ml. methylene dichloride dropwise during fifteen minutes. The mixture was diluted with chloroform and washed with dilute aqueous sodium bicarbonate solution and water. The organic phase was separated, dried over sodium sulfate and evaporated to dryness to yield 17.0 g. N-(5,6,7,8-tetrahydro-1-naphthyl) 2,2,4-trichlorobutyramide as a yellow oil which was used as such in the next step.

(B) 3,3-dichloro-1-(5,6,7,8-tetrahydro-1-naphthyl)-2-pyrrolidinone

To a stirred ice-cooled solution of 16.0 g. N-(5,6,7,8-tetrahydro-1-naphthyl)-2,2,4 - trichlorobutyramide from Example 31A in 150 ml. methyl alcohol was added a solution of 2 g. sodium hydroxide in 10 ml. water dropwise during five minutes. The reaction mixture was diluted with water and the precipitate was collected by filtration to yield after recrystallization from methylene dichloride-hexane 9.2 g. 3,3-dichloro-1-(5,6,7,8-tetrahydro-1-naphthyl)-2-pyrrolidinone; M.P. 129–131° C.

EXAMPLE 32

(A) N-(3,4-dichlorobenzyl)-2,2,4-trichlorobutyramide

To a stirred ice-cooled mixture of 17.6 g. 3,4-dichlorobenzylamine in 200 ml. ethylene dichloride and 4.2 g. sodium hydroxide in 100 ml. water was added 21 g. 2,2,4-trichlorobutyryl chloride. The mixture was stirred for one-half hour and the precipitate was filtered and washed with water. The ethylene dichloride layer was washed with dilute hydrochloric acid and water, dried over sodium sulfate, and evaporated to dryness to yield N-(3,4-dichlorobenzyl)-2,2,4-trichlorobutyramide as a solid which was combined with the crop obtained by filtration and used as such in the next step.

(B) 3,3-dichloro-1-(3,4-dichlorobenzyl)-2-pyrrolidinone

To a stirred solution of the N-(3,4-dichlorobenzyl)-2,2,4-trichlorobutyramide, from Example 32A, in 200 ml. ethyl alcohol was added a solution of 4.2 sodium hydroxide in 42 ml. water. Stirring was continued for ten minutes and dilute aqueous hydrochloric acid was added until the solution turned acidic, followed by 300 ml. water. The resulting crystals were filtered to give, after crystallization from chloroformhexane 16.0 g. 3,3-dichloro-1-(3,4-dichlorobenzyl)-2-pyrrolidinone; M.P. 94.0–94.8° C.

EXAMPLE 33

(A) N-(4-chlorobenzyl)-2,2,4-trichlorobutyramide

To a stirred ice-cooled mixture of 7.08 g. 4-chlorobenzylamine in 75 ml. ethylene dichloride and 4.4 g. sodium bicarbonate in 50 ml. water, in a nitrogen atmosphere, was added a solution of 2,2,4-trichlorobutyryl chloride in 25 ml. ethylene dichloride dropwise during one-half hour and stirring was continued one-half hour. The ethylene dichloride phase was separated, washed with dilute hydrochloric acid and water, and evaporated to dryness to yield N-(4-chlorobenzyl)-2,2,4-trichlorobutyramide which was used as such in the next step.

(B) 3,3-dichloro-1-(4-chlorobenzyl)-2-pyrrolidinone

To a stirred solution of the N-(4-chlorobenzyl)-2,2,4-trichlorobutyramide from Example 33A in 100 ml. ethyl alcohol, in a nitrogen atmosphere, was added a solution of 2.1 g. sodium hydroxide in water dropwise during one-half hour and stirring was continued one-half hour. The precipitate was filtered to give, after recrystallization from methyl alcohol-water 8.2 g. 3,3-dichloro-1-(4-chlorobenzyl)-2-pyrrolidinone, M.P. 72–74° C.

Following a procedure similar to that described in Example 33A and substituting for 4-chlorobenzylamine an equivalent amount of:

(a) 5-phenylhexylamine
(b) 6-phenylhexylamine
(c) 3-(3,4-dichlorophenyl)propylamine
(d) benzylamine
(e) 4-benzylbenzylamine
(f) 4-benzyloxybenzylamine
(g) 4-n-butoxy-α-methylbenzylamine
(h) 2-chloro-3-methoxy-6-methylbenzylamine
(i) 2-chloro-4-methylsulfonylbenzylamine
(j) 2-chloro-6-nitrobenzylamine
(k) α-methyl-4-phenoxybenzylamine
(l) 3,4,5-trimethoxybenzylamine
(m) 2-methylmercaptobenzylamine
(n) 3-(trifluoromethyl)benzylamine
(o) 4-dimethylaminophenethylamine there can be obtained respectively, according to this invention:

(a) N-(5-phenylhexyl)-2,2,4-trichlorobutyramide
(b) N-(6-phenylhexyl)-2,2,4-trichlorobutyramide
(c) N-[3-(3,4-dichlorophenyl)propyl]-2,2,4-trichlorobutyramide
(d) N-benzyl-2,2,4-trichlorobutyramide
(e) N-(4-benzylbenzyl)-2,2,4-trichlorobutyramide
(f) N-(4-benzyloxybenzyl)-2,2,4-trichlorobutyramide
(g) N-(4-n-butoxy-α-methylbenzyl)-2,2,4-trichlorobutyramide
(h) N-(2-chloro-3-methoxy-6-methylbenzyl)-2,2,4-trichlorobutyramide
(i) N-(2-chloro-4-methylsulfonylbenzyl)-2,2,4-trichlorobutyramide
(j) N-(2-chloro-6-nitrobenzyl)-2,2,4-trichlorobutyramide
(k) N-(α-methyl-4-phenoxybenzyl)-2,2,4-trichlorobutyramide
(l) N-(3,4,5-trimethoxybenzyl)-2,2,4-trichlorobutyramide
(m) N-(2-methylmercaptobenzyl)-2,2,4-trichlorobutyramide
(n) N-[3-(trifluoromethyl)benzyl]-2,2,4-trichlorobutyramide
(o) N-(4-dimethylaminophenethyl)-2,2,4-trichlorobutyramide Following a procedure similar to that described in Example 33B and substituting for N-(4-chlorobenzyl)-2,2,4-trichlorobutyramide an equivalent amount of:

(a) N-(5-phenylhexyl)-2,2,4-trichlorobutyramide
(b) N-(6-phenylhexyl)-2,2,4-trichlorobutyramide
(c) N-[3-(3,4-dichlorophenyl)propyl]-2,2,4-trichlorobutyramide
(d) N-benzyl-2,2,4-trichlorobutyramide
(e) N-(4-benzylbenzyl)-2,2,4-trichlorobutyramide
(f) N-(4-benzyloxybenzyl)-2,2,4-trichlorobutyramide
(g) N-(4-n-butoxy-α-methylbenzyl)-2,2,4-trichlorobutyramide
(h) N-(2-chloro-3-methoxy-6-methylbenzyl)-2,2,4-trichlorobutyramide
(i) N-(2-chloro-4-methylsulfonylbenzyl)-2,2,4-trichlorobutyramide
(j) N-(2-chloro-6-nitrobenzyl)-2,2,4-trichlorobutyramide
(k) N-(α-methyl-4-phenoxybenzyl)-2,2,4-trichlorobutyramide
(l) N-(3,4,5-trimethoxybenzyl)-2,2,4-trichlorobutyramide
(m) N-(2-methylmercaptobenzyl)-2,2,4-trichlorobutyramide
(n) N-[3-(trifluoromethyl)benzyl]-2,2,4-trichlorobutyramide
(o) N-(4-dimethylaminophenethyl)-2,2,4-trichlorobutyramide there can be obtained respectively, according to this invention:

(a) 3,3-dichloro-1-(5-phenylhexyl)-2-pyrrolidinone
(b) 3,3-dichloro-1-(6-phenylhexyl)-2-pyrrolidinone
(c) 3,3-dichloro-1-[3-(3,4-dichlorophenyl)propyl]-2-pyrrolidinone
(d) 3,3-dichloro-1-benzyl-2-pyrrolidinone
(e) 3,3-dichloro-1-(4-benzylbenzyl)-2-pyrrolidinone
(f) 3,3-dichloro-1-(4-benzyloxybenzyl)-2-pyrrolidinone
(g) 3,3-dichloro-1-(4-n-butoxy-α-methylbenzyl)-2-pyrrolidinone
(h) 3,3-dichloro-1-(2-chloro-3-methoxy-6-methylbenzyl)-2-pyrrolidinone
(i) 3,3-dichloro-1-(2-chloro-4-methylsulfonylbenzyl)-2-pyrrolidinone
(j) 3,3-dichloro-1-(2-chloro-6-nitrobenzyl)-2-pyrrolidinone
(k) 3,3-dichloro-1-(α-methyl-4-phenoxybenzyl)-2-pyrrolidinone
(l) 3,3-dichloro-1-(3,4,5-trimethoxybenzyl)-2-pyrrolidinone
(m) 3,3-dichloro-1-(2-methylmercaptobenzyl)-2-pyrrolidinone
(n) 3,3-dichloro-1-[3-(trifluoromethyl)benzyl]-2-pyrrolidinone
(o) 3,3-dichloro-1-(4-dimethylaminophenethyl)-2-pyrrolidinone

EXAMPLE 34

(A) N-(4-chlorophenethyl)-2,2,4-trichlorobutyramide

Following a procedure similar to that described in Example 33A and using 7.78 g. 2-(4-chlorophenyl)ethylamine, 4.4 g. sodium bicarbonate, and 10.5 g. 2,2,4-trichlorobutyryl chloride, there was obtained N-(4-chlorophenethyl)-2,2,4-trichlorobutyramide which was used as such in the next step.

(B) 3,3-dichloro-1-(4-chlorophenethyl)-2-pyrrolidinone

Following a procedure similar to that described in Example 33B and using the N-(4-chlorophenethyl)-2,2,4-trichlorobutyramide from Example 34A, there was obtained after recrystallization from methyl alcohol 6.3 g.

3,3-dichloro-1-(4-chlorophenethyl)-2-pyrrolidinone; M.P. 78–80° C.

EXAMPLE 35

(A) N-phenethyl-2,2,4-trichlorobutyramide

Following a procedure similar to that described in Example 33A and using 6.05 g. phenethylamine, 2.1 g. sodium hydroxide, and 10.5 g. 2,2,4-trichlorobutyryl chloride, there was obtained N-phenethyl-2,2,4-trichlorobutyramide as an orange oil which was used as such in the next step.

(B) 3,3-dichloro-1-phenethyl-2-pyrrolidinone

Following a procedure similar to that described in Example 33B and using the N-phenethyl-2,2,4-trichlorobutyramide from Example 35A and 2.1 g. sodium hydroxide, there was obtained after recrystallization from methyl alcohol-water 7.9 g. 3,3-dichloro-1-phenethyl-2-pyrrolidinone; M.P. 84–85° C.

EXAMPLE 36

(A) N-[3-(3-indolyl)propyl]-2,2,4-trichlorobutyramide

Following a procedure similar to that described in Example 33A and using 6.8 g. 3-(3-indolyl)propylamine, 3.5 g. sodium bicarbonate, and 8.2 g. 2,2,4-trichlorobutyryl chloride, there was obtained 12.5 g. N-[3-(3-indolyl)propyl]-2,2,4-trichlorobutyramide as a brown gum which was used as such in the next step.

(B) 3,3-dichloro-1-[3-(3-indolyl)propyl]-2-pyrrolidinone

Following a procedure similar to that described in Example 33B and using 12.5 g. N-[3-(3-indolyl)propyl]-2,2,4-trichlorobutyramide from Example 36A and 1.6 g. sodium hydroxide, there was obtained after recrystallization from methyl alcohol 4.2 g. 3,3-dichloro-1-[3-(3-indolyl)propyl]-2-pyrrolidinone; M.P. 103–105° C.

Following a procedure similar to that described in Example 33A and substituting for 4-chlorobenzylamine an equivalent amount of:

(a) 3-aminomethylindole
(b) 3-(2-aminoethyl)indole
(c) 3-(2-amino-1-methylethyl)-4-fluoroindole
(d) 3-(2-amino-2-methylethyl)-5-methoxyindole
(e) 3-(2-aminoethyl)-5-benzyloxy-2-methylindole
(f) 3-(2-aminoethyl)-4,7-dichloroindole
(g) 3-(2-aminoethyl)-5-methylmercaptoindole
(h) 3-(2-aminoethyl)-7-(trifluoromethyl)indole
(i) 3-(2-aminoethyl)-5-phenoxyindole
(j) 3-(2-aminoethyl)-6-dimethylaminoindole
(k) 3-(2-aminoethyl)-4,5,6-trimethoxyindole
(l) 3-(2-aminoethyl)-2-phenethylindole
(m) 3-(2-aminoethyl)-5-n-butoxyindole there can be obtained respectively, according to this invention:

(a) N-(3-indolylmethyl)-2,2,4-trichlorobutyramide
(b) N-[2-(3-indolyl)ethyl]-2,2,4-trichlorobutyramide
(c) N-[2-(4-fluoro-3-indolyl)-2-methylethyl]-2,2,4-trichlorobutyramide
(d) N-[2-(5-methoxy-3-indolyl)-1-methylethyl]2,2,4-trichlorobutyramide
(e) N-[2-(5-benzyloxy-2-methyl-3-indolyl)ethyl]-2,2,4-trichlorobutyramide
(f) N-[2-(4,7-dichloro-3-indolyl)ethyl]-2,2,4-trichlorobutyramide
(g) N-[2-(5-methylmercapto-3-indolyl)ethyl]-2,2,4-trichlorobutyramide
(h) N-{2-[7-(trifluoromethyl)-3-indolyl]ethyl}-2,2,4-trichlorobutyramide
(i) N-[2-(5-phenoxy-3-indolyl)ethyl]-2,2,4-trichlorobutyramide
(j) N-[2-(6-dimethylamino-3-indolyl)ethyl]2,2,4-trichlorobutyramide
(k) N-[2-(4,5,6-trimethoxy-3-indolyl)ethyl]-2,2,4-trichlorobutyramide
(l) N-[2-(2-phenethyl-3-indolyl)ethyl]-2,2,4-trichlorobutyramide
(m) N-[2-(5-n-butoxy-3-indolyl)ethyl]-2,2,4-trichlorobutyramide Following a procedure similar to that described in Example 33B and substituting for N-(4-chlorobenzyl)-2,2,4-trichlorobutyramide an equivalent amount of:

(a) N-(3-indolylmethyl)-2,2,4-trichlorobutyramide
(b) N-[2-(3-indolyl)ethyl]-2,2,4-trichlorobutyramide
(c) N-[2-(4-fluoro-3-indolyl)-2-methylethyl]-2,2,4-trichlorobutyramide
(d) N-[2-(5-methoxy-3-indolyl)-1-methylethyl]-2,2,4-trichlorobutyramide
(e) N-[2-(5-benzyloxy-2-methyl-3-indolyl)ethyl]-2,2,4-trichlorobutyramide
(f) N-[2-(4,7-dichloro-3-indolyl)ethyl]-2,2,4-trichlorobutyramide
(g) N-[2-(5-methylmercapto-3-indolyl)ethyl]-2,2,4-trichlorobutyramide
(h) N-{2-[7-(trifluoromethyl)-3indolyl]ethyl}-2,2,4-trichlorobutyramide
(i) N-[2-(5-phenoxy-3-indolyl)ethyl]2,2,4-trichlorobutyramide
(j) N-[2-(6-dimethylamino-3-indolyl)ethyl]-2,2,4-trichlorobutyramide
(k) N-[2-(4,5,6-trimethoxy-3-indolyl)ethyl]-2,2,4-trichlorobutyramide
(l) N-[2-(2-phenethyl-3-indolyl)ethyl]2,2,4-trichlorobutyramide
(m) N-[2-(5-n-butoxy-3-indolyl)ethyl]2,2,4-trichlorobutyramide there can be obtained respectively, according to this invention:

(a) 3,3-dichloro-1-(3-indolylmethyl)-2-pyrrolidinone
(b) 3,3-dichloro-1-[2-(3-indolyl)ethyl]-2-pyrrolidinone
(c) 3,3-dichloro-1-[2-(4-fluoro-3-indolyl)-2-methylethyl]-2-pyrrolidinone
(d) 3,3-dichloro-1-[2-(5-methoxy-3-indolyl)-1-methylethyl]-2-pyrrolidinone
(e) 3,3-dichloro-1-[2-(5-benzyloxy-2-methyl-3-indolyl)-ethyl]-2-pyrrolidinone
(f) 3,3-dichloro-1-[2-(4,7-dichloro-3-indolyl)ethyl]-2-pyrrolidinone
(g) 3,3-dichloro-1-[2-(5-methylmercapto-3-indolyl)ethyl]-2-pyrrolidinone
(h) 3,3-dichloro-1-{2-[7-(trifluoromethyl)-3-indolyl]-ethyl}-2-pyrrolidinone
(i) 3,3-dichloro-1-[2-(5-phenoxy-3-indoyly)ethyl]-2-pyrrolidinone
(j) 3,3-dichloro-1-[2-(6-dimethylamino-3-indolyl)ethyl]-2-pyrrolidinone
(k) 3,3-dichloro-1-[2-(4,5,6-trimethoxy-3-indolyl)-ethyl]-2-pyrrolidinone
(l) 3,3-dichloro-1-[2-(2-phenethyl-3-indolyl)ethyl]-2-pyrrolidinone
(m) 3,3-dichloro-1-[2-(5-n-butoxy-3-indoyly)ethyl]-2-pyrrolidinone

EXAMPLE 37

(A) N,N'-hexamethylene-bis(2,2,4-trichlorobutyramide)

To a stirred ice-cooled mixture of 11.0 g. hexamethylenediamine in 200 ml. ethylene dichloride and 8.5 g. sodium hydroxide in 100 ml. water was added 42.0 g. 2,2,4-trichlorobutyryl chloride dropwise during one-half hour and stirring was then continued at room temperature for two hours. The mixture was diluted with water, washed with saturated aqueous sodium bicarbonate solution, water, dilute aqueous hydrochloric acid solution, and saturated sodium chloride solution. The ethylene dichloride phase was separated, dried over magnesium sulfate, and evaporated to dryness to yield after recrystallization from hexane-ether 39.1 g. N,N'-hexamethylenebis(2,2,4-trichlorobutyramide); M.P. 81–82° C.

(B) 1,1'-hexamethylene-bis(3,3-dichloro-2-pyrrolidinone)

To a solution of 10.0 g. N,N'-hexamethylene-bis(2,2,4-trichlorobutyramide) from Example 37A in 35 ml. dimethylsulfoxide was added 2.2 g. of a mixture of sodium hydride in mineral oil (52.9% sodium hydride) and the mixture was stirred for one hour with occasional cooling in order to maintain the reaction at room temperature. The resulting solution was heated on a steam bath until the pH reached seven and was then poured onto ice and extracted with chloroform. The chloroform solution was evaporated to dryness to yield after recrystallization from carbon tetrachloride 4.1 g. 1,1'-hexamethylene-bis(3,3-dichloro-2-pyrrolidinone); M.P. 90.6–91.8° C. (corr.).

Following a procedure similar to that described in Example 37A and substituting for hexamethylenediamine an equivalent amount of:

(a) ethylenediamine
(b) octamethylenediamine
(c) dodecamethylenediamine
(d) 1,2-diamino-2-methylpropane there can be obtained respectively, according to this invention:

(a) N,N'-ethylene-bis(2,2,4-trichlorobutyramide)
(b) N,N'-octamethylene-bis(2,2,4-trichlorobutyramide)
(c) N,N'-dodecamethylene-bis(2,2,4-trichlorobutyramide)
(d) N,N-(1,1-dimethylethylene)-bis(2,2,4-trichlorobutyramide)

Following a procedure similar to that described in Example 37B and subustituting for N,N'-hexamethylene-bis-(2,2,4-trichlorobutyramide) an equivalent amount of:

(a) N,N'-ethylene-bis(2,2,4-trichlorobutyramide)
(b) N,N'-octamethylene-bis(2,2,4-trichlorobutyramide)
(c) N,N'-dodecamethylene-bis(2,2,4-trichlorobutyramide)
(d) N,N'-(1,1-dimethylethylene)-bis(2,2,4-trichlorobutyramide)

there can be obtained respectively, according to this invention:

(a) 1,1'-ethylene-bis(3,3-dichloro-2-pyrrolidinone)
(b) 1,1'-octamethylene-bis(3,3-dichloro-2-pyrrolidinone)
(c) 1,1'-dodecamethylene-bis(3,3-dichloro-2-pyrrolidinone)
(d) 1,1'-(1,1-dimethylethylene)-bis(3,3-dichloro-2-pyrrolidinone)

EXAMPLE 38

(A) N,N'-(4-xylylene)bis(2,2,4-trichlorobutyramide)

To a stirred, ice-cooled mixture of 6.8 g. 4-xylylenediamine in 200 ml. ethylene dichloride and 4.2 g. sodium hydroxide in 100 ml. water was added 21 g. of 2,2,4-trichlorobutyryl chloride dropwise during fifteen minutes and stirring was continued for one-half hour. The resulting precipitate was collected by filtration and washed with water. The filtrate was washed with dilute aqueous hydrochloric acid solution and water, dried over sodium sulfate, and evaporated to dryness to yield, after combination with the crop obtained by filtration followed by trituration in ether-hexane, N,N'-(4-xylylene)bis(2,2,4-trichlorobutyramide); M.P. 93–98° C.

(B) 1,1'-(4-xylylene)bis(3,3-dichloro-2-pyrrolidinone)

To a stirred solution of the N,N' - (4 - xylylene)bis-(2,2,4-trichlorobutyramide), from Example 38A, in 200 ml. ethyl alcohol was added a solution of 4.2 g. sodium hydroxide in 42 ml. water. Stirring was continued for ten minutes and dilute aqueous hydrochloric acid solution was added until the solution turned acidic, followed by 300 ml. water. The resulting crystals were filtered to give after recrystallization from chloroform-hexane 4.9 g. 1,1'-(4-xylylene)bis(3,3-dichloro - 2 - pyrrolidinone); M.P. 219.2–222.0° C. (dec.) (corr.).

Following a procedure similar to that described in Example 38A and substituting for 4-xylylenediamine an equivalent amount of:

(a) 2-xylylenediamine
(b) 3-xylylenediamine
(c) 2,2'-(4-phenylene)bis(ethylamine)
(d) 2,2'-(3-phenylene)bis(ethylamine)
(e) 2,2'-(2-phenylene)bis(ethylamine)
(f) 2,2'-(2,5-dimethyl-4-phenylene)bis(ethylamine)
(g) 5-tert-butyl-3-xylylenediamine
(h) 2,4,6-trimethyl-3-xylylenediamine
(i) 4-methoxy-6-methyl-3-xylylenediamine
(j) α,α'-dimethyl-4-xylylenediamine
(k) 2,5-dimethoxy-4-xylylenediamine
(l) 2,2'-(4-phenylene)bis(1-methylethylamine)

there can be obtained respectively, according to this invention:

(a) N,N'-(2-xylylene)bis(2,2,4-trichlorobutyramide)
(b) N,N'-(3-xylylene)bis(2,2,4-trichlorobutyramide)
(c) N,N'-[2,2'-(4-phenylene)bisethyl]bis(2,2,4-trichlorobutyramide)
(d) N,N'-[2,2'-(3-phenylene)bisethyl]bis(2,2,4-trichlorobutyramide)
(e) N,N'-[2,2'-(2-phenylene)bisethyl]bis(2,2,4-trichlorobutyramide)
(f) N,N'-[2,2'-(2,5-dimethyl-4-phenylene)bisethyl]bis-(2,2,4-trichlorobutyramide)
(g) N,N'-(5-tert-butyl-3-xylylene)bis(2,2,4-trichlorobutyramide)
(h) N,N'-(2,4,6-trimethyl-3-xylylene)bis(2,2,4-trichlorobutyramide)
(i) N,N'-(4-methoxy-6-methyl-3-xylylene)bis(2,2,4-trichlorobutyramide)
(j) N,N'-(α,α'-dimethyl-4-xylylene)bis(2,2,4-trichlorobutyramide)
(k) N,N'-(2,5-dimethoxy-4-xylylene)bis(2,2,4-trichlorobutyramide)
(l) N,N'-[2,2'-(4-phenylene)bis(1-methylethyl)]bis-(2,2,4-trichlorobutyramide)

Following a procedure similar to that described in Example 38B and substituting for N,N'-(4-xylylene)bis-(2,2,4-trichlorobutyramide) an equivalent amount of:

(a) N,N'-(2-xylylene)bis(2,2,4-trichlorobutyramide)
(b) N,N'-(3-xylylene)bis(2,2,4-trichlorobutyramide)
(c) N,N'-[2,2'-(4-phenylene)bisethyl]bis(2,2,4-trichlorobutyramide)
(d) N,N'-[2,2'-(3-phenylene)bisethyl]bis(2,2,4-trichlorobutyramide)
(e) N,N'-[2,2'-(2-phenylene)bisethyl]bis(2,2,4-trichlorobutyramide)
(f) N,N'-[2,2'-(2,5-dimethyl-4-phenylene)bisethyl]bis-(2,2,4-trichlorobutyramide)
(g) N,N'-(5-tert-butyl-3-xylylene)bis(2,2,4-trichlorobutyramide)
(h) N,N'-(2,4,6-trimethyl-3-xylylene)bis(2,2,4-trichlorobutyramide)
(i) N,N'-(4-methoxy-6-methyl-3-xylylene)bis(2,2,4-trichlorobutyramide)
(j) N,N'-(α,α'-dimethyl-4-xylylene)bis(2,2,4-trichlorobutyramide)
(k) N,N'-(2,5-dimethoxy-4-xylylene)bis(2,2,4-trichlorobutyramide)
(l) N,N'-[2,2'-(4-phenylene)bis(1-methylethyl)]bis-(2,2,4-trichlorobutyramide)

there can be obtained respectively, according to this invention:

(a) 1,1'-(2-xylylene)bis(3,3-dichloro-2-pyrrolidinone)
(b) 1,1'-(3-xylylene)bis(3,3-dichloro-2-pyrrolidinone)

(c) 1,1'-[2,2'-(4-phenylene)bisethyl]bis(3,3-dichloro-2-pyrrolidinone)
(d) 1,1'-[2,2'-(3-phenylene)bisethyl]bis(3,3-dichloro-2-pyrrolidinone)
(e) 1,1'-[2,2'-(2-phenylene)bisethyl]bis(3,3-dichloro-2-pyrrolidinone)
(f) 1,1'-[2,2'-(2,5-dimethyl-4-phenylene)bisethyl]bis-(3,3-dichloro-2-pyrrolidinone)
(g) 1,1'-(5-tert-butyl-3-xylylene)bis(3,3-dichloro-2-pyrrolidinone)
(h) 1,1'-(2,4,6-trimethyl-3-xylylene)bis(3,3-dichloro-2-pyrrolidinone)
(i) 1,1'-(4-methoxy-6-methyl-3-xylylene)bis(3,3-dichloro-2-pyrrolidinone)
(j) 1,1'-(α,α'-dimethyl-4-xylylene)bis(3,3-dichloro-2-pyrrolidinone)
(k) 1,1'-(2,5-dimethoxy-4-xylylene)bis(3,3-dichloro-2-pyrrolidinone)
(l) 1,1'-[2,2'-(4-phenylene)bis(1-methylethyl)]bis(3,3-dichloro-2-pyrrolidinone)

EXAMPLE 39

(A) N,N'-(2-chloro-1,4-phenylene)bis(2,2,4-trichlorobutyramide)

To a stirred, ice-cooled mixture of 6.02 g. 2-chloro-1,4-phenylenediamine in 150 ml. benzene and 6.15 g. sodium carbonate in 100 ml. water was added a solution of 11.5 g. 2,2,4-trichlorobutyryl chloride in 30 ml. benzene dropwise during twenty minutes and stirring was continued with cooling for fifteen minutes and at room temperature for one and one-half hours. The benzene layer was separated and washed with water, 0.5 N aqueous hydrochloric acid solution, water, 5% aqueous sodium bicarbonate solution, and water, dried over calcium sulfate and evaporated to dryness to yield on crystallization from hexane 8.33 g. N,N'-(2-chloro-1,4-phenylene)bis(2,2,4-trichlorobutyramide); M.P. 90.0–91.5° C.

(B) 1,1'-(2-chloro-1,4-phenylene)bis(3,3-dichloro-2-pyrrolidinone)

To a stirred mixture of 9.77 g. N,N'-(2-chloro-1,4-phenylene)bis(2,2,4-trichlorobutyramide) in 75 ml. ethyl alcohol was added 0.8 g. sodium hydroxide in 10 ml. water. When the pH of the mixture returned to seven another 0.8 g. sodium hydroxide in 10 ml. water was added and when the pH returned to seven it was adjusted to approximately thirteen by the addition of 50% aqueous sodium hydroxide solution. The mixture was diluted with water and the precipitate was filtered and washed with water to yield after recrystallization from acetone-hexane 5.8 g. 1,1'-(2-chloro-1,4-phenylene)bis(3,3-dichloro-2-pyrrolidinone); M.P. 240–242° C. (dec.).

Following a procedure similar to that described in Example 39A and substituting for 2-chloro-1,4-phenylenediamine an equivalent amount of:

(a) 1,2-phenylenediamine
(b) 1,3-phenylenediamine
(c) 1,4-phenylenediamine
(d) 3,4-di(trifluoromethyl)-1,2-phenylenediamine
(e) 5-bromo-3,4-dimethyl-1,2-phenylenediamine
(f) 3,6-di-n-butoxy-1,2-phenylenediamine
(g) 4-n-butyl-1,2-phenylenediamine
(h) 4-tert-butyl-1,2-phenylenediamine
(i) 4,5-dichloro-1,2-phenylenediamine
(j) 4,6-diethylsulfonyl-1,3-phenylenediamine
(k) 4,6-diethylmercapto-1,3-phenylenediamine
(l) 4,5-dimethoxy-1,3-phenylenediamine
(m) 2,6-dinitro-4-methoxy-1,3-phenylenediamine
(n) 2,5-diethoxy-1,4-phenylenediamine
(o) 2-chloro-6-methoxy-1,4-phenylenediamine there can be obtained respectively, according to this invention:

(a) N,N'-(1,2-phenylene)bis(2,2,4-trichlorobutyramide)
(b) N,N'-(1,3-phenylene)bis(2,2,4-trichlorobutyramide)
(c) N,N'-(1,4-phenylene)bis(2,2,4-trichlorobutyramide)
(d) N,N'-[3,4-di(trifluoromethyl)-1,2-phenylene](2,2,4-trichlorobutyramide)
(e) N,N'-(5-bromo-3,4-dimethyl-1,2-phenylene)bis(2,2,4-trichlorobutyramide)
(f) N,N'-(3,6-di-n-butoxy-1,2-phenylene)bis(2,2,4-trichlorobutyramide)
(g) N,N'-(4-n-butyl-1,2-phenylene)bis(2,2,4-trichlorobutyramide)
(h) N,N'-(4-tert-butyl-1,2-phenylene)bis(2,2,4-trichlorobutyramide)
(i) N,N'-(4,5-dichloro-1,2-phenylene)bis(2,2,4-trichlorobutyramide)
(j) N,N'-(4,6-diethylsulfonyl-1,3-phenylene)bis(2,2,4-trichlorobutyramide)
(k) N,N'-(4,6-diethylmercapto-1,3-phenylene)bis(2,2,4-trichlorobutyramide)
(l) N,N'-(4,5-dimethoxy-1,3-phenylene)bis(2,2,4-trichlorobutyramide)
(m) N,N'-(2,6-dinitro-4-methoxy-1,3-phenylene)bis 2,2,4-trichlorobutyramide)
(n) N,N'-(2,5-diethoxy-1,4-phenylene)bis(2,2,4-trichlorobutyramide)
(o) N,N'-(2-chloro-6-methoxy-1,4-phenylene)bis(2,2,4-trichlorobutyramide)

Following a procedure similar to that described in Example 39B and substituting for N,N'-(2-chloro-1,4-phenylene)bis(2,2,4 - trichlorobutyramide) an equivalent amount of:

(a) N,N'-(1,2-phenylene)bis(2,2,4-trichlorobutyramide)
(b) N,N'-(1,3-phenylene)bis(2,2,4-trichlorobutyramide)
(c) N,N'-(1,4-phenylene)bis(2,2,4-trichlorobutyramide)
(d) N,N'-[3,4-di(trifluoromethyl)-1,2-phenylene]bis 2,2,4-trichlorobutyramide)
(e) N,N'-(5-bromo-3,4-dimethyl-1,2-phenylene)bis 2,2,4-trichlorobutyramide)
(f) N,N'-(3,6-di-n-butoxy-1,2-phenylene)bis(2,2,4-trichlorobutyramide)
(g) N,N'-(4-n-butyl-1,2-phenylene)bis(2,2,4-trichlorobutyramide)
(h) N,N'-(4-tert-butyl-1,2-phenylene)bis(2,2,4-trichlorobutyramide)
(i) N,N'-(4,5-dichloro-1,2-phenylene)bis(2,2,4-trichlorobutyramide)
(j) N,N'-(4,6-diethylsulfonyl-1,3-phenylene)bis(2,2,4-trichlorobutyramide)
(k) N,N'-(4,6-diethylmercapto-1,3-phenylene)bis(2,2,4-trichlorobutyramide)
(l) N,N'-(4,5-dimethoxy-1,3-phenylene)bis(2,2,4-trichlorobutyramide)
(m) N,N'-(2,6-dinitro-4-methoxy-1,3-phenylene)bis(2,2,4-trichlorobutyramide)
(n) N,N'-(2,5-diethoxy-1,4-phenylene)bis(2,2,4-trichlorobutyramide)
(o) N,N'-(2-chloro-6-methoxy-1,4-phenylene)bis(2,2,4-trichlorobutyramide)

there can be obtained respectively, according to this invention:

(a) 1,1'-(1,2-phenylene)bis(3,3-dichloro-2-pyrrolidinone)
(b) 1,1'-(1,3-phenylene)bis(3,3-dichloro-2-pyrrolidinone)
(c) 1,1'-(1,4-phenylene)bis(3,3-dichloro-2-pyrrolidinone)
(d) 1,1'-[3,4-di(trifluoromethyl)-1,2-phenylene]bis(3,3-dichloro-2-pyrrolidinone)
(e) 1,1'-(5-bromo-3,4-dimethyl-1,2-phenylene)bis(3,3-dichloro-2-pyrrolidinone)
(f) 1,1'-(3,6-di-n-butoxy-1,2-phenylene)bis(3,3-dichloro-2-pyrrolidinone)

(g) 1,1'-(4-n-butyl-1,2-phenylene)bis(3,3-dichloro-2-pyrrolidinone)
(h) 1,1'-(4-tert-butyl-1,2-phenylene)bis(3,3-dichloro-2-pyrrolidinone)
(i) 1,1'-(4,5-dichloro-1,2-phenylene)bis(3,3-dichloro-2-pyrrolidinone)
(j) 1,1'-(4,6-diethylsulfonyl-1,3-phenylene)bis(3,3-dichloro-2-pyrrolidinone)
(k) 1,1'-(4,6-diethylmercapto-1,3-phenylene)bis(3,3-dichloro-2-pyrrolidinone)
(l) 1,1'-(4,5-dimethoxy-1,3-phenylene)bis(3,3-dichloro-2-pyrrolidinone)
(m) 1,1'-(2,6-dinitro-4-methoxy-1,3-phenylene)bis(3,3-dichloro-2-pyrrolidinone)
(n) 1,1'-(2,5-diethoxy-1,4-phenylene)bis(3,3-dichloro-2-pyrrolidinone)
(o) 1,1'-(2-chloro-6-methoxy-1,4-phenylene)bis(3,3-dichloro-2-pyrrolidinone)

EXAMPLE 40

(A) N,N'-(4-chloro-1,3-phenylene)bis(2,2,4-trichlorobutyramide)

Following a procedure similar to that described in Example 39A and using 7.12 g. 4-chloro-1,3-phenylenediamine, 11.24 g. sodium carbonate, and 21.0 g. 2,2,4-trichlorobutyryl chloride, there was obtained after crystallization from hexane 20.7 g. N,N' - (4-chloro-1,3-phenylene)bis(2,2,4-trichlorobutyramide); M.P. 90.5–92.0° C.

(B) 1,1'-(4-chloro-1,3-phenylene)bis(3,3-dichloro-2-pyrrolidinone)

Following a procedure similar to that described in Example 39B and using 17.15 g. N,N'-(4-chloro-1,3-phenylene)bis(2,2,4-trichlorobutyramide) from Example 40A and 2.8 g. sodium hydroxide there was obtained after recrystallization from methyl alcohol 11.1 g. 1,1'-(4-chloro-1,3 - phenylene)bis(3,3 - dichloro-2-pyrrolidinone); M.P. 154–155° C.

EXAMPLE 41

(A) N,N'-(4-chloro-1,2-phenylene)bis(2,2,4-trichlorobutyramide)

Following a procedure similar to that described in Example 39A and using 7.13 g. 4-chloro-1,2-phenylenediamine, 5.62 g. sodium carbonate, and 21.0 g. 2,2,4-trichlorobutyryl chloride, there was obtained 19.0 g. N,N'-(4 - chloro - 1,2 - phenylene)bis(2,2,4 - trichlorobutyramide) as crystals.

(B) 1,1'-(4-chloro-1,2-phenylene)bis(3,3-dichloro-2-pyrrolidinone)

Following a procedure similar to that described in Example 39B and using 11.8 g. N,N'-(4-chloro-1,2-phenylene)bis(2,2,4-trichlorobutyramide) from Example 41A and 3.88 g. sodium hydroxide, there was obtained after recrystallization from methyl alcohol 8.22 g. 1,1'-(4-chloro - 1,2 - phenylene)bis(3,3 - dichloro-2-pyrrolidinone); M.P. 228–229° C.

EXAMPLE 42

(A) N,N'-(3,3'-dichloro-4,4'-biphenylylene)bis(2,2,4-trichlorobutyramide)

To a stirred mixture of 6.33 g. 3,3'-dichloro-4,4'-biphenyldiamine in 200 ml. benzene and 5.62 sodium carbonate in 60 ml. water, cooled to 10° C., was added a solution of 10.5 g. 2,2,4-trichlorobutyryl chloride in 50 ml. benzene dropwise during twenty minutes and stirring was continued twenty minutes at 10 to 15° C. and one and one-half hours at room temperature. The benzene phase was separated, washed with water, saturated aqueous sodium bicarbonate solution, water, 1 N aqueous hydrochloric acid solution and water, dried over calcium sulfate, and evaporated to dryness to yield N,N'-(3,3'-dichloro - 4,4' - biphenylylene)bis(2,2,4 - trichlorobutyramide) as a viscous oil which was used as such in the next step.

(B) 1,1'-(3,3'-dichloro-4,4'-biphenylylene)bis(3,3-dichloro-2-pyrrolidinone)

To a stirred mixture of the N,N'-(3,3'-dichloro-4,4'-biphenylylene)bis(2,2,4 - trichlorobutyramide) from Example 42A in 100 ml. ethyl alcohol was added a solution of 1.0 g. sodium hydroxide in 20 ml. water and when the pH returned to seven another solution of 1.0 g. sodium hydroxide in 20 ml. water was added and finally the pH was adjusted to approximately thirteen by the addition of a few drops of 50% aqueous sodium hydroxide solution. The mixture was diluted with water and the resulting precipitate was filtered to yield after recrystallization successively from acetone and chloroform 5.07 g. 1,1'-(3,3'-dichloro - 4,4' - biphenylylene)bis(3,3 - dichloro-2-pyrrolidinone); M.P. 265–266° C. (dec.).

Following a procedure similar to that described in Example 42A and substituting for 3,3'-dichloro-4,4'-biphenyldiamine an equivalent amount of:

(a) 2,2'-biphenyldiamine
(b) 2,3'-biphenyldiamine
(c) 2,4'-biphenyldiamine
(d) 3,3'-biphenyldiamine
(e) 3,4'-biphenyldiamine
(f) 4,4'-biphenyldiamine
(g) 3,3'-dihexyloxy-4,4'-biphenyldiamine
(h) 4,5'-dinitro-2,2'-biphenyldiamine
(i) 5-chloro-2,4'-biphenyldiamine
(j) 2,2',4,4',6,6'-hexamethyl-3,3'-biphenyldiamine
(k) 4,4'-di(trifluoromethyl)-2,2'-biphenyldiamine
(l) 2',5,6'-tribromo-6-iodo-3,4'-biphenyldiamine
(m) 4,4'-dimethylmercapto-3,3'-biphenyldiamine
(n) 2,2'-dichloro-5,5'-diethoxy-4,4'-biphenyldiamine
(o) 3,3'-diethyl-4,4'-biphenyldiamine
(p) 3,3'-diphenethyloxy-4,4'-biphenyldiamine
(q) 3,3'-diphenoxy-4,4'-biphenyldiamine
(r) 3-methylsulfonyl-4,4'-biphenyldiamine
(s) 3',5'-dibromo-4-nitro-2,4'-biphenyldiamine there can be obtained respectively, according to this invention:

(a) N,N'-(2,2'-biphenylylene)bis(2,2,4-trichlorobutyramide)
(b) N,N'-(2,3'-biphenylylene)bis(2,2,4-trichlorobutyramide)
(c) N,N'-(2,4'-biphenylene)bis(2,2,4-trichlorobutyramide)
(d) N,N'-(3,3'-biphenylylene)bis(2,2,4-trichlorobutyramide)
(e) N,N'-(3,4'-biphenylylene)bis(2,2,4-trichlorobutyramide)
(f) N,N'-(4,4'-biphenylylene)bis(2,2,4-trichlorobutyramide)
(g) N,N'-(3,3'-dihexyloxy-4,4'-biphenylylene)bis(2,2,4-trichlorobutyramide)
(h) N,N'-(4,5'-dinitro-2,2'-biphenylylene)bis(2,2,4-trichlorobutyramide)
(i) N,N'-(5-chloro-2,4'-biphenylylene)bis(2,2,4-trichlorobutyramide)
(j) N,N'-(2,2',4,4',6,6'-hexamethyl-3,3'-biphenylylene)bis(2,2,4-trichlorobutyramide)
(k) N,N'-[4,4'-di(trifluoromethyl)-2,2'-biphenylylene]bis(2,2,4-trichlorobutyramide)
(l) N,N'-(2',5,6'-tribromo-6-iodo-3,4'-biphenylylene)bis(2,2,4-trichlorobutyramide)
(m) N,N'-(4,4'-dimethylmercapto-3,3'-biphenylylene)bis(2,2,4-trichlorobutyramide)
(n) N,N'-(2,2'-dichloro-5,5'-diethoxy-4,4'-biphenylylene)bis(2,2,4-trichlorobutyramide)
(o) N,N'-(3,3'-diethyl-4,4'-biphenylylene)bis(2,2,4-trichlorobutyramide)
(p) N,N'-(3,3'-diphenethyloxy-4,4'-biphenylylene)bis(2,2,4-trichlorobutyramide)

(q) N,N'-(3,3'-diphenoxy-4,4'-biphenylylene)bis(2,2,4-trichlorobutyramide)
(r) N,N'-(3-methylsulfonyl-4,4'-biphenylylene)bis(2,2,4-trichlorobutyramide)
(s) N,N'-(3,5'-dibromo-4-nitro-2,4'-biphenylylene)bis(2,2,4-trichlorobutyramide)

Following a procedure similar to that described in Example 42B and substituting for N,N'-(3,3'-dichloro-4,4'-biphenylylene)bis(2,2,4-trichlorobutyramide) an equivalent amount of:

(a) N,N'-(2,2'-biphenylylene)bis(2,2,4-trichlorobutyramide)
(b) N,N'-(2,3'-biphenylylene)bis(2,2,4-trichlorobutyramide)
(c) N,N'-(2,4'-biphenylylene)bis(2,2,4-trichlorobutyramide)
(d) N,N'-(3,3'-biphenylylene)bis(2,2,4-trichlorobutyramide)
(e) N,N'-(3,4'-biphenylylene)bis(2,2,4-trichlorobutyramide)
(f) N,N'-(4,4'-biphenylylene)bis(2,2,4-trichlorobutyramide)
(g) N,N'-(3,3'-dihexyloxy-4,4'-bipheylylene)bis(2,2,4-trichlorobutyramide)
(h) N,N'-(4,5'-dinitro-2,2'-biphenylylene)bis(2,2,4-trichlorobutyramide)
(i) N,N'-(5-chloro-2,4'-biphenylylene)bis(2,2,4-trichlorobutyramide)
(j) N,N'-(2,2',4,4',6,6'-hexamethyl-3,3'-biphenylylene)bis(2,2,4-trichlorobutyramide)
(k) N,N'-[4,4'-di(trifluoromethyl)-2,2'-biphenylylene]bis(2,2,4-trichlorobutyramide)
(l) N,N'-(2',5,6'-tribromo-6-iodo-3,4'-biphenylylene)bis(2,2,4-trichlorobutyramide)
(m) N,N'-(4,4'-dimethylmercapto-3,3'-biphenylylene)bis(2,2,4-trichlorobutyramide)
(n) N,N'-(2,2'-dichloro-5,5'-diethoxy-4,4'-biphenylylene)bis(2,2,4-trichlorobutyramide)
(o) N,N'-(3,3'-diethyl-4,4'-biphenylylene)bis(2,2,4-trichlorobutyramide)
(p) N,N'-(3,3'-diphenethyloxy-4,4'-biphenylylene)bis(2,2,4-trichlorobutyramide)
(q) N,N'-(3,3'-diphenoxy-4,4'-biphenylylene)bis(2,2,4-trichlorobutyramide)
(r) N,N'-(3-methylsulfonyl-4,4'-biphenylylene)bis(2,2,4-trichlorobutyramide)
(s) N,N'-(3',5'-dibromo-4-nitro-2,4'-biphenylylene)bis(2,2,4-trichlorobutyramide)

there can be obtained respectively, according to this invention:

(a) 1,1'-(2,2'-biphenylylene)bis(3,3-dichloro-2-pyrrolidinone)
(b) 1,1'-(2,3'-biphenylylene)bis(3,3-dichloro-2-pyrrolidinone)
(c) 1,1'-(2,4'-biphenylylene)bis(3,3-dichloro-2-pyrrolidinone)
(d) 1,1'-(3,3'-biphenylylene)bis(3,3-dichloro-2-pyrrolidinone)
(e) 1,1'-(biphenylylene)bis(3,3-dichloro-2-pyrrolidinone)
(f) 1,1'-(4,4'-biphenylylene)bis(3,3-dichloro-2-pyrrolidinone)
(g) 1,1'-(3,3'-dihexyloxy-4,4'-biphenylylene)bis(3,3-dichloro-2-pyrrolidinone)
(h) 1,1'-(4,5'-dinitro-2,2'-biphenylylene)bis(3,3-dichloro-2-pyrrolidinone)
(i) 1,1'-(5-chloro-2,4'-biphenylylene)bis(3,3-dichloro-2-pyrrolidinone)
(j) 1,1'-(2,2',4,4',6,6'-hexamethyl-3,3'-biphenylylene)bis(3,3-dichloro-2-pyrrolidinone)
(k) 1,1'-(4,4'-di(trifluoromethyl)-2,2'-biphenylylene)bis(3,3-dichloro-2-pyrrolidinone)
(l) 1,1'-(2',5,6'-tribromo-6-iodo-3,4'-biphenylylene)bis(3,3-dichloro-2-pyrrolidinone)
(m) 1,1'-(4,4'-dimethylmercapto-3,3'-biphenylylene)bis(3,3-dichloro-2-pyrrolidinone)
(n) 1,1'-(2,2'-dichloro-5,5'-diethoxy-4,4'-biphenylylene)bis(3,3-dichloro-2-pyrrolidinone)
(o) 1,1'-(3,3'-diethyl-4,4'-biphenylylene)bis(3,3-dichloro-2-pyrrolidinone)
(p) 1,1'-(3,3'-diphenethyloxy-4,4'-biphenylylene)bis(3,3-dichloro-2-pyrrolidinone)
(q) 1,1'-(3,3'-diphenoxy-4,4'-biphenylylene)bis(3,3-dichloro-2-pyrrolidinone)
(r) 1,1'-(3-methylsulfonyl-4,4'-biphenylylene)bis(3,3-dichloro-2-pyrrolidinone)
(s) 1,1'-(3',5'-dibromo-4-nitro-2,4'-biphenylylene)bis(3,3-dichloro-2-pyrrolidinone)

EXAMPLE 43

(A) N-(2,6-dimethyl-4-pyrimidyl)-2,2,4-trichlorobutyramide

To a stirred solution of 15.0 g. 4-amino-2,6-dimethylpyrimidine in 500 ml. ethylene dichloride and 13.0 g. sodium carbonate in 100 ml. water, at room temperature, was added 26 g. 2,2,4-trichlorobutyryl chloride in 50 ml. ethylene dichloride dropwise during forty-five minutes and stirring was continued for four and one-half hours. The ethylene dichloride layer was separated, washed with water, dried over sodium sulfate, and evaporated to dryness to yield 22 g. of N-(2,6-dimethyl-4-pyrimidyl)-2,2,4-trichlorobutyramide as a yellow oil which was used as such in the next step.

(B) 3,3-dichloro-1-(2,6-dimethyl-4-pyrimidyl)-2-pyrrolidinone

To a stirred ice-cooled solution of 20 g. N-(2,6-dimethyl - 4 - pyrimidyl) - 2,2,4 - trichlorobutyramide, from Example 43A, in 200 ml. methyl alcohol was added a solution of 2.4 g. sodium hydroxide in 10 ml. water and stirring was continued for one hour. The mixture was evaporated to a small volume and extracted with ethyleen dichloride. The extract was washed with water, dried over sodium sulfate and evaporated to dryness to yield, after trituration with cold ether and recrystallization from methyl alcohol-water and ether-hexane, 5.98 g. 3,3-dichloro-1-(2,6-dimethyl - 4 - pyrimidyl)-2-pyrrolidinone; M.P. 99–100° C.

Following a procedure similar to that described in Example 43A and substituting for 4-amino-2,6-dimethylpyrimidine an equivalent amount of:

(a) 2-aminopyrimidine
(b) 4-aminopyrimidine
(c) 5-aminopyrimidine
(d) 4-amino-5-bromo-6-chloro-2-methylmercaptopyrimidine
(e) 5-amino-2,4-bis(dimethylamino)pyrimidine
(f) 4-amino-2-n-butyl-6-chloro-5-nitropyrimidine
(g) 4-amino-6-(trifluoromethyl)pyrimidine
(h) 2-amino-5-benzyl-4-chloropyrimidine
(i) 5-amino-2,4-diphenoxypyrimidine
(j) 4-amino-2-ethylsulfonyl-5-methylpyrimidine
(k) 2-amino-5-n-butoxypyrimidine
(l) 5-amino-4-chloro-6-methoxy-2-methylpyrimidine
(m) 4-amino-5-hexyl-2-propylpyrimidine
(n) 2-acetamido-5-aminopyrimidine there can be obtained respectively, according to this invention.

(a) N-(2-pyrimidyl)-2,2,4-trichlorobutyramide
(b) N-(4-pyrimidyl)-2,2,4-trichlorobutyramide
(c) N-(5-pyrimidyl)-2,2,4-trichlorobutyramide
(d) N-(5-bromo-6-chloro-2-methylmercapto-4-pyrimidyl)-2,2,4-trichlorobutyramide
(e) N-[2,4-bis(dimethylamino)-5-pyrimidyl]-2,2,4-trichlorobutyramide (f) N-(2-n-butyl-6-chloro-5-nitro-4-pyrimidyl)-2,2,4-trichlorobutyramide
(g) N-[6-(trifluoromethyl)-4-pyrimidyl]-2,2,4-trichlorobutyramide
(h) N-(5-benzyl-4-chloro-2-pyrimidyl)-2,2,4-trichlorobutyramide
(i) N-2,4-diphenoxy-5-pyrimidyl)-2,2,4-trichlorobutyramide
(j) N-(2-ethylsulfonyl-5-methyl-4-pyrimidyl)-2,2,4-trichlorobutyramide
(k) N-(5-n-butoxy-2-pyrimidyl)-2,2,4-trichlorobutyramide
(l) N-(4-chloro-6-methoxy-2-methyl-5-pyrimidyl)-2,2,4-trichlorobutyramide
(m) N-(5-hexyl-2-propyl-4-pyrimidyl)-2,2,4-trichlorobutyramide
(n) N-(2-acetamido-5-pyrimidyl)2,2,4-trichlorobutyramide Following a procedure similar to that described in Example 43B and substituting for N-(2,6-dimethyl-4-pyrimidyl) - 2,2,4 - trichlorobutyramide an equivalent amount of:

(a) N-(2-pyrimidyl)-2,2,4-trichlorobutyramide
(b) N-(4-pyrimidyl)-2,2,4-trichlorobutyramide
(c) N-(5-pyrimidyl)-2,2,4-trichlorobutyramide
(d) N-(5-bromo-6-chloro-2-methylmercapto-4-pyrimidyl)-2,2,4-trichlorobutyramide
(e) N-[2,4-bis(dimethylamino)-5-pyrimidyl]-,2,4-trichlorobutyramide
(f) N-(2-n-butyl-6-chloro-5-nitro-4-pyrimidyl)-2,2,4-trichlorobutyramide
(g) N-[6-(trifluoromethyl)-4-pyrimidyl]-2,2,4-trichlorobutyramide
(h) N-(5-benzyl-4-chloro-2-pyrimidyl)-2,2,4-trichlorobutyramide
(i) N-(2,4-diphenoxy-5-pyrimidyl)-2,2,4-trichlorobutyramide
(j) N-(2-ethylsulfonyl-5-methyl-4-pyrimidyl)-2,2,4-trichlorobutyramide
(k) N-(5-n-butoxy-2-pyrimidyl)-2,2,4-trichlorobutyramide
(l) N-(4-chloro-6-methoxy-2-methyl-5-pyrimidyl)-2,2,4-trichlorobutyramide
(m) N-(5-hexyl-2-propyl-4-pyrimidyl)-2,2,4-trichlorobutyramide
(n) N-(2-acetamido-5-pyrimidyl)-2,2,4-trichlorobutyramide there can be obtained respectively, according to this invention:

(a) 3,3-dichloro-1-(2-pyrimidyl)-2-pyrrolidinone
(b) 3,3-dichloro-1-(4-pyrimidyl)-2-pyrrolidione
(c) 3,3-dichloro-1-(5-pyrimidyl)-2-pyrrolidinone
(d) 3,3-dichloro-1-(5-bromo-6-chloro-2-methylmercapto-4-pyrimidyl)-2-pyrrolidinone
(e) 3,3-dichloro-1-[2,4-bis(dimethylamino)-5-pyrimidyl]-2-pyrrolidinone
(f) 3,3-dichloro-1-(2-n-butyl-6-chloro-5-nitro-4-pyrimidyl)-2-pyrrolidinone
(g) 3,3-dichloro-1-[6-(trifluoromethyl)-4-pyrimidyl]-2-pyrrolidinone
(h) 3,3-dichloro-1-(5-benzyl-4-chloro-2-pyrimidyl)-2-pyrrolidinone
(i) 3,3-dichloro-1-(2,4-diphenoxy-5-pyrimidyl)-2-pyrrolidinone
(j) 3,3-dichloro-1-(2-ethylsulfonyl-5-methyl-4-pyrimidyl)-2-pyrrolidinone
(k) 3,3-dichloro-1-(5-n-butoxy-2-pyrimidyl)-2-pyrrolidinone
(l) 3,3-dichloro-1-(4-chloro-6-methoxy-2-methyl-5-pyrimidyl)-2-pyrrolidinone
(m) 3,3-dichloro-1-(5-hexyl-2-propyl-4-pyrimidyl)-2-pyrrolidinone
(n) 3,3-dichloro-1-(2-acetamido-5-pyrimidyl)-2-pyrrolidinone By treating 3,3 - dichloro-1-(2-acetamido-5-pyrimidyl) 2-pyrrolidinone in absolute ethyl alcohol, at room temperature, with an ethereal solution containing an amount of hydrogen chloride slightly in excess of that required to hydrolyze the acetamido group, there can be obtained the hydrochloride salt of 3,3-dichloro-1-(2-amino-5-pyrimidyl)-2-pyrrolidinone which can be converted to the free base by dissolving the salt in ethyl alcohol and treating the resulting solution with an equivalent amount of sodium carbonate in water.

I claim:
1. A compound having the formula

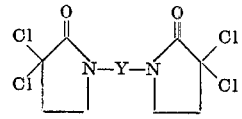

where Y is alkylene having from two to twelve carbon atoms.

2. 1,1'-hexamethylene-bis(3,3-dichloro - 2 - pyrrolidinone) according to claim 1, where Y is hexamethylene.

References Cited

UNITED STATES PATENTS

| | | | |
|---|---|---|---|
| 2,784,191 | 3/1957 | Fischer et al. | 260—294.7 |
| 3,072,652 | 1/1963 | Hickner et al. | 260—244 |
| 3,103,509 | 9/1963 | Schickh | 260—239.3 |

NICHOLAS S. RIZZO, Primary Examiner

J. A. NARCAVAGE, Assistant Examiner

U.S. Cl. X.R.

260—256.4, 256.5, 294.8, 295, 304, 305, 326.12, 326.13, 326.14, 562; 424—251, 263, 270, 274

PO-1050
(5/69)

UNITED STATES PATENT OFFICE
CERTIFICATE OF CORRECTION

Patent No. 3,549,654            Dated December 22, 1970

Inventor(s) Joseph C. Collins

It is certified that error appears in the above-identified patent and that said Letters Patent are hereby corrected as shown below:

Column 3, line 25, "acetyl propionyl" should read --acetyl propionyl--; line 32, "Formulas VI and VIII" should read --Formulas VI and VII--.

Column 8, line 32, "M.P. 118-19.5°C" should read --M.P. 118 119.5°C.--.

Column 15, line 3, "pyridyl)-pyrrolidinone" should read --pyridyl)-2-pyrrolidinone--.

Column 16, line 46, "3-nitro-pyridyl)" should read --3-nitro-5-pyridyl)--.

Column 18, line 26, "(6-ethylmerctpo" should read --(6-ethylmercapto--; line 38, "(...6-benzothazolyl)" should read --(...6-benzothiazolyl)--; line 64, "dichloro-(2" should read --dichloro-1-(2--.

Column 19, line 14, "N-9-(oxo" should read --N-(9-oxo--.

Column 20, line 25, "(2-methoxy-fluorenyl)" should read --(2-methoxy-1-fluorenyl)--.

Column 24, line 23, "-3indolyl" should read -- -3-indolyl-- line 52, "indoyly" should read --indolyl--; line 60, "indoyly" should read --indolyl--.

Column 28, line 6, "phenylene](2,2,4-" should read --phenylene]bis(2,2,4- --; line 40, "2,2,4-" should read --(2,2,4- --; line 42, "2,2,4-" should read --(2,2,4- --.

Column 31, line 5, "(3,5'" should read --(3',5'--; line 62 "1'-(biphenylylene" should read --1'-(3,4'-biphenylylene--.

Column 33, line 29, "pyrimidyl]-2,4-" should read --pyrimi 2,2,4- --.

Signed and sealed this 17th day of August 1971.

(SEAL)
Attest:

EDWARD M. FLETCHER, JR.          WILLIAM E. SCHUYLER, JR.
Attesting Officer                 Commissioner of Patents